US 6,602,627 B2

(12) United States Patent
Liu et al.

(10) Patent No.: US 6,602,627 B2
(45) Date of Patent: Aug. 5, 2003

(54) UNINTERRUPTIBLE POWER SUPPLIES USING FUEL CELLS

(75) Inventors: Frank Liu, Bellingham, WA (US); Paul Humphreys, Bellingham, WA (US); Thanh Le, Bellingham, WA (US); Thomas H. Sloane, Bellingham, WA (US)

(73) Assignee: Alpha Technologies, Inc., Bellingham, WA (US)

( * ) Notice: Subject to any disclaimer, the term of this patent is extended or adjusted under 35 U.S.C. 154(b) by 165 days.

(21) Appl. No.: 09/812,292

(22) Filed: Mar. 20, 2001

(65) Prior Publication Data

US 2002/0006536 A1 Jan. 17, 2002

Related U.S. Application Data

(60) Provisional application No. 60/191,816, filed on Mar. 24, 2000, and provisional application No. 60/190,602, filed on Mar. 20, 2000.

(51) Int. Cl.[7] .......................... H01M 8/00; H01M 8/04; H01M 8/12
(52) U.S. Cl. ............................ 429/23; 429/13; 429/17; 429/22
(58) Field of Search .................. 429/12, 13, 17, 429/19, 22, 23

(56) References Cited

U.S. PATENT DOCUMENTS

| | | | |
|---|---|---|---|
| 3,823,358 A | 7/1974 | Rey | |
| 4,251,736 A | 2/1981 | Coleman | |
| 4,472,641 A | 9/1984 | Dickey et al. | |
| 4,670,702 A | 6/1987 | Yamada et al. | |
| 4,700,122 A | 10/1987 | Cimino et al. | |
| 4,775,800 A | 10/1988 | Wood | |
| 4,890,213 A | 12/1989 | Seki | |
| 4,988,283 A * | 1/1991 | Nagasawa et al. ............. | 429/17 |
| 5,154,986 A * | 10/1992 | Takechi et al. ................ | 429/23 |
| 5,410,720 A | 4/1995 | Osterman | |
| 5,638,244 A | 6/1997 | Mekanik et al. | |
| 5,642,002 A | 6/1997 | Mekanik et al. | |
| 5,739,595 A | 4/1998 | Mekanik et al. | |
| 5,747,887 A * | 5/1998 | Takanaga et al. ............. | 307/64 |
| 5,760,495 A | 6/1998 | Mekanik | |
| 5,783,932 A | 7/1998 | Namba et al. | |
| 5,880,536 A | 3/1999 | Mardirossian | |
| 5,892,431 A | 4/1999 | Osterman | |
| 5,897,766 A * | 4/1999 | Kawatsu ....................... | 204/426 |
| 5,925,476 A * | 7/1999 | Kawatsu ....................... | 429/24 |
| 5,961,604 A | 10/1999 | Anderson et al. | |
| 5,994,793 A * | 11/1999 | Bobry ........................ | 307/64 |
| 6,011,324 A | 1/2000 | Kohlstruck et al. | |
| 6,014,015 A | 1/2000 | Thorne et al. | |
| 6,028,414 A | 2/2000 | Chouinard et al. | |
| 6,100,665 A * | 8/2000 | Alderman .................... | 320/127 |
| 6,198,178 B1 * | 3/2001 | Schienbein et al. ........... | 307/82 |
| 6,212,081 B1 * | 4/2001 | Sakai .......................... | 363/71 |
| 6,288,456 B1 * | 9/2001 | Cratty ......................... | 307/64 |
| 6,465,910 B2 * | 10/2002 | Young et al. ................. | 307/64 |

\* cited by examiner

Primary Examiner—Randy Gulakowski
Assistant Examiner—Donald V. Scaltrito
(74) Attorney, Agent, or Firm—Michael R. Schacht; Schacht Law Office, Inc.

(57) ABSTRACT

An uninterruptible power supply system comprising a source of a utility power signal, a source of hydrogen, a fuel cell stack, first and second input circuits, an output circuit, and a control circuit. The fuel cell stack converts the hydrogen into a fuel cell output signal. The first input circuit is operatively connected to the utility power signal and outputs a first AC input signal based on the utility power signal. The second input circuit operatively is connected to the fuel cell output signal and generates a second AC input signal based on the fuel cell output signal. The output circuit is operatively connected to the first and second input circuits and outputs at least one output signal based on one of the first and second AC input signals. The control circuit operatively is connected to the fuel cell stack, the first input circuit, the second input circuit. The output circuit controls whether the output signal is generated based on the utility power signal or hydrogen.

30 Claims, 16 Drawing Sheets

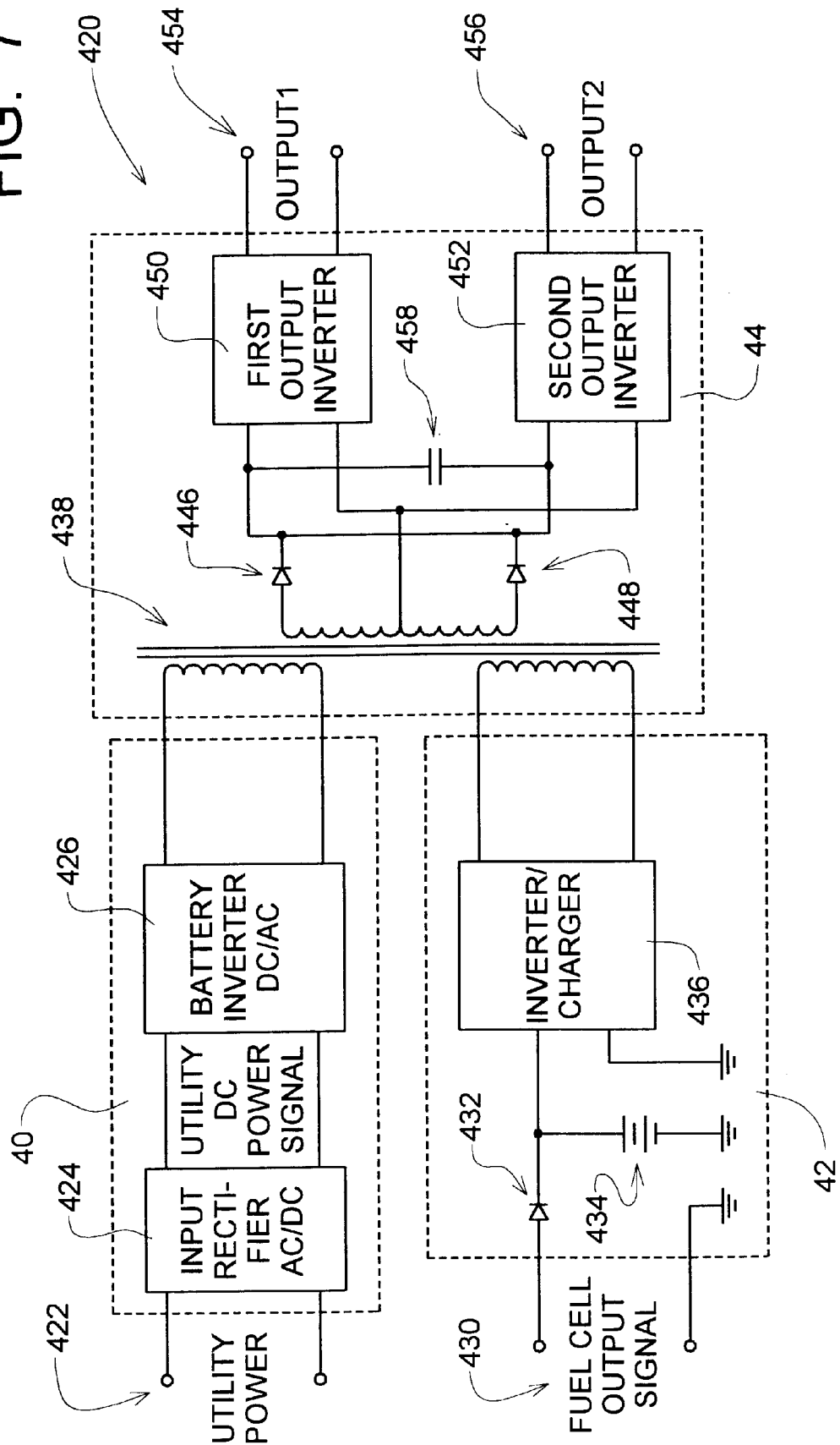

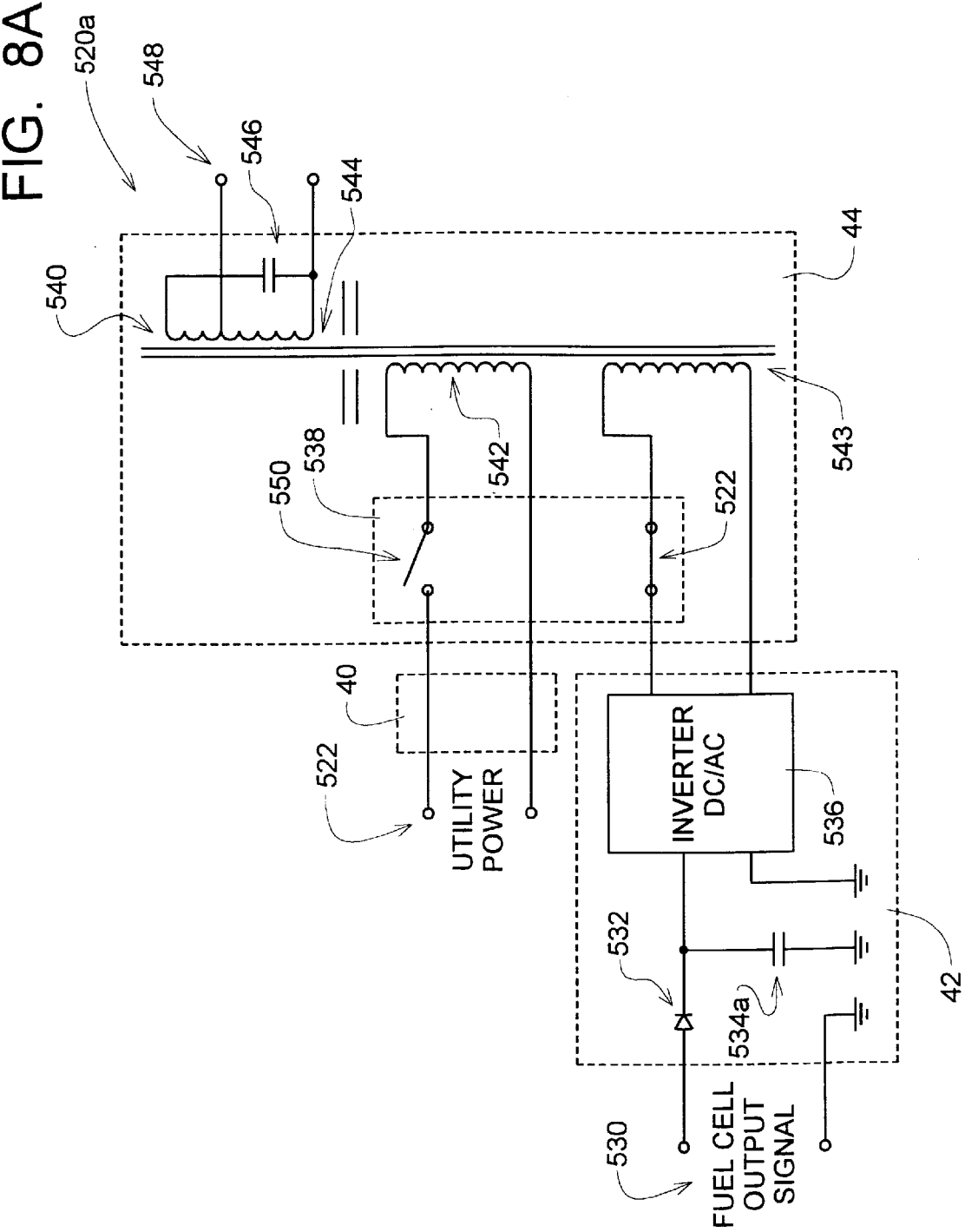

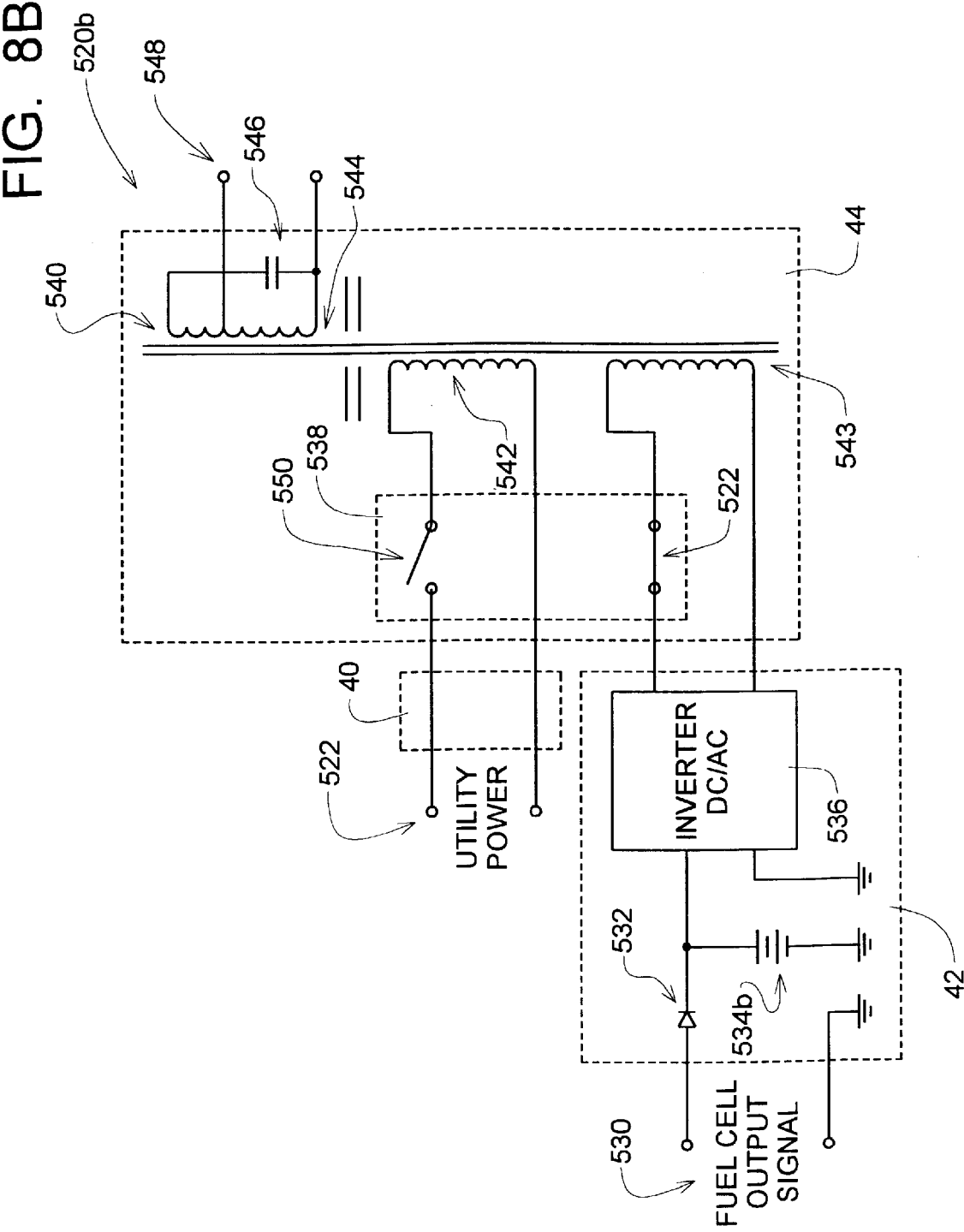

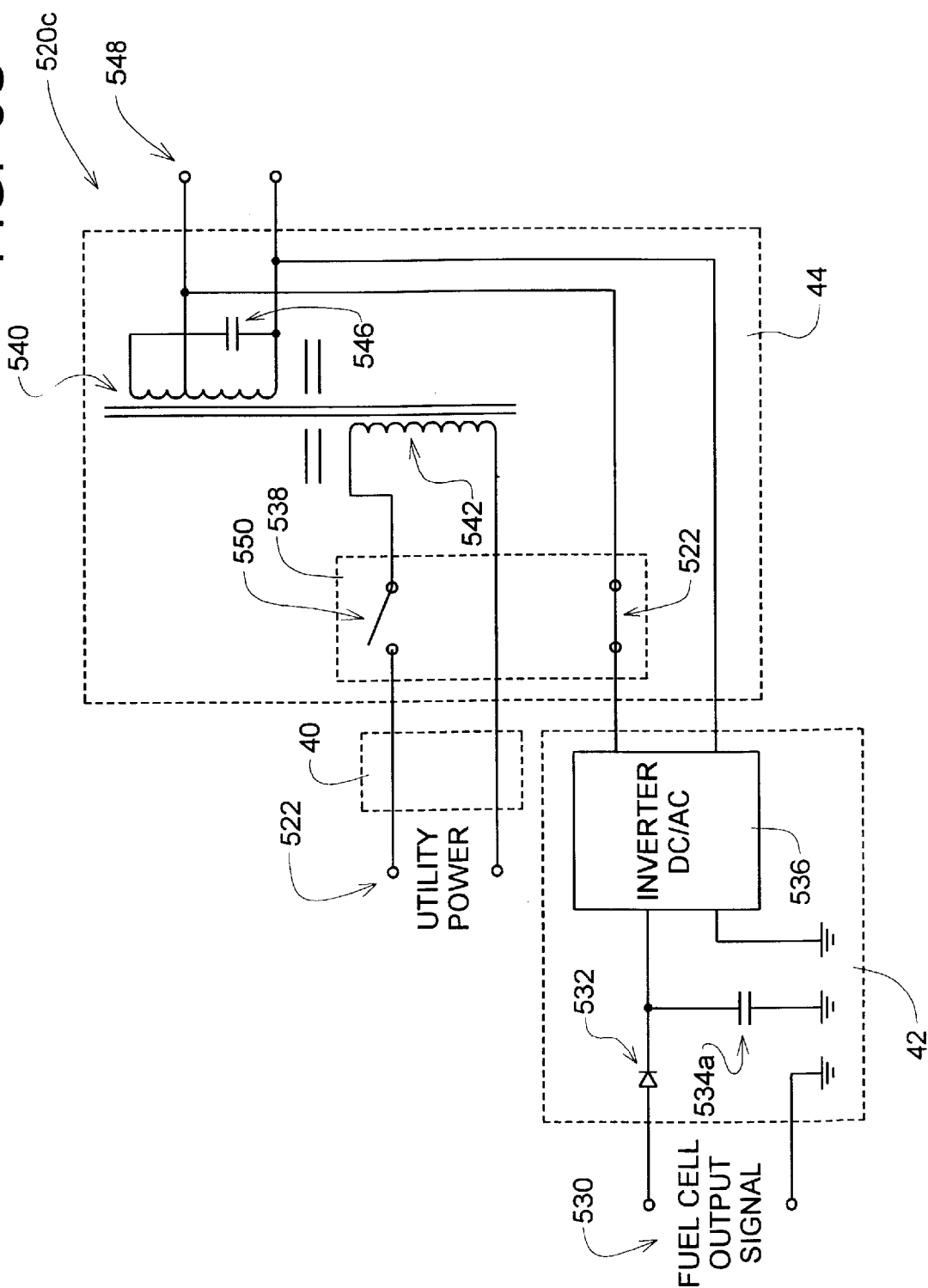

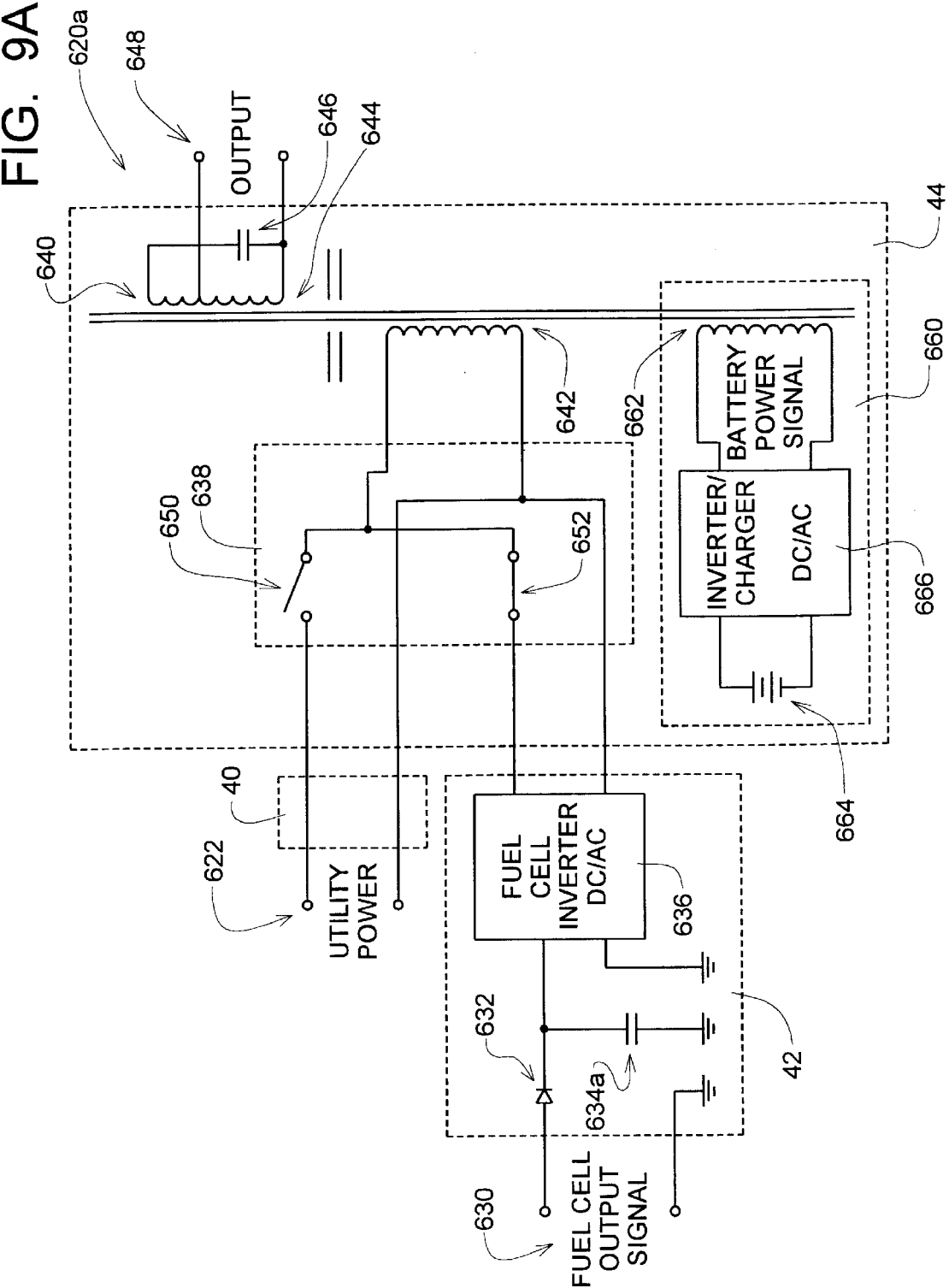

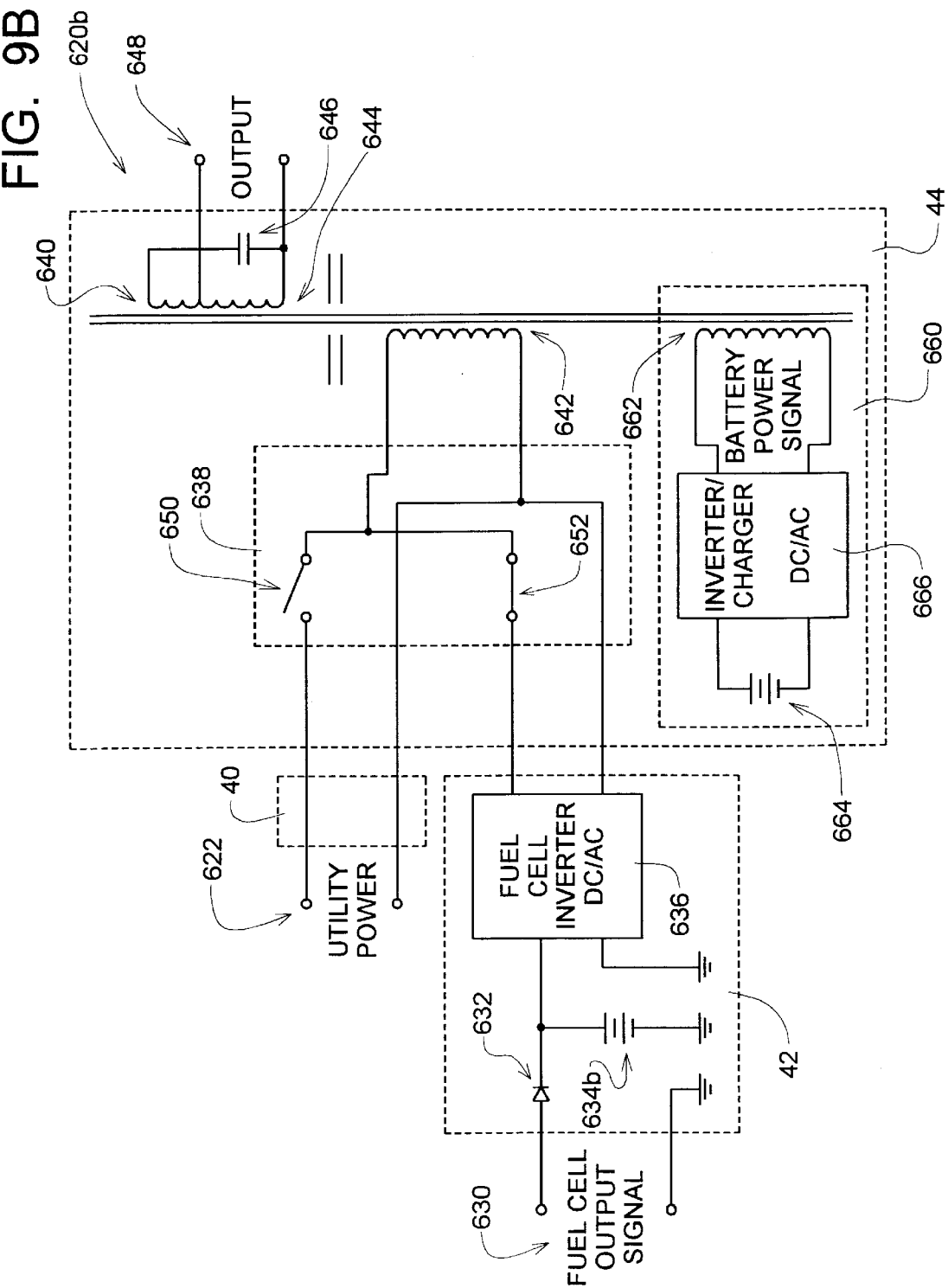

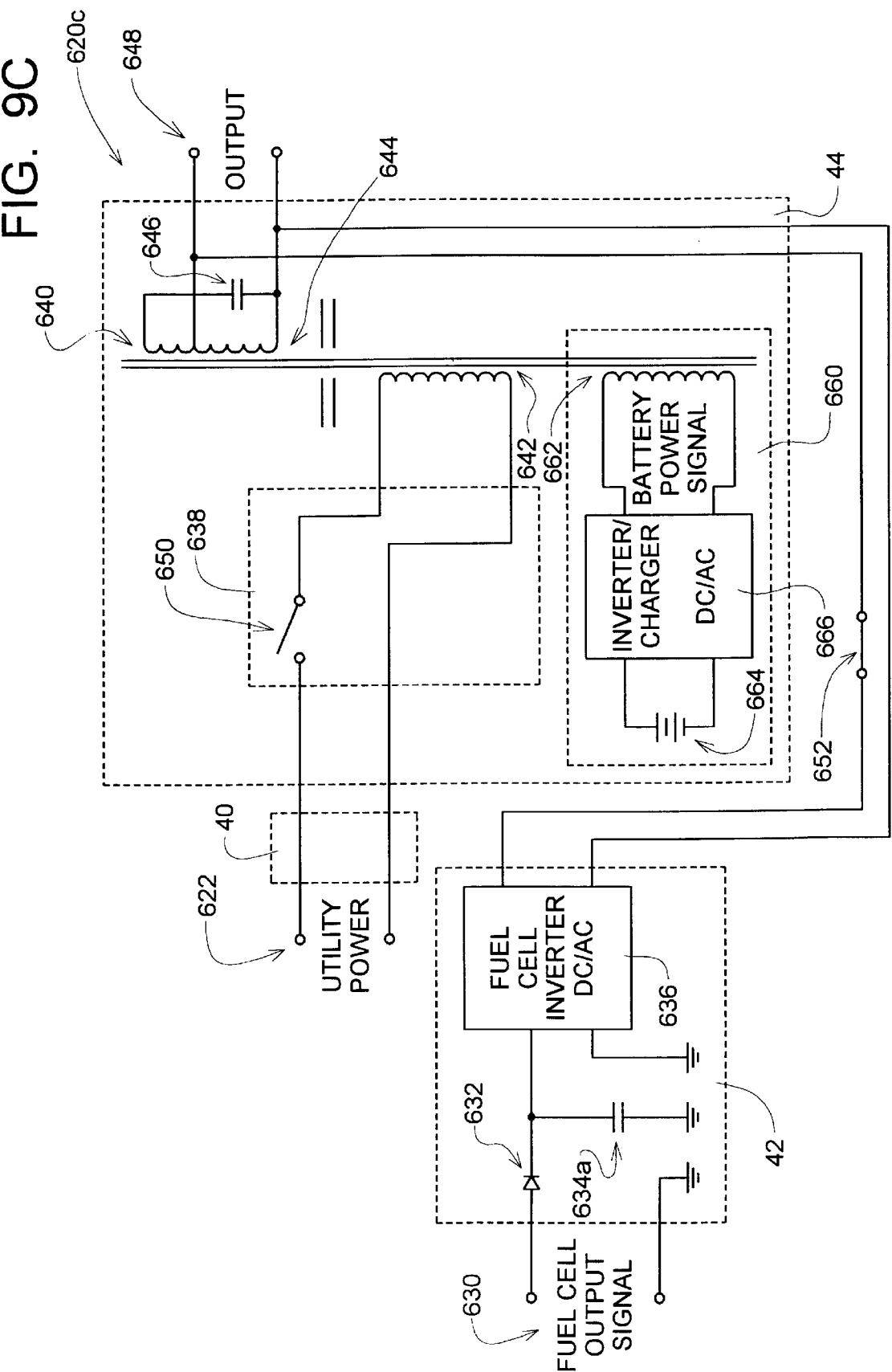

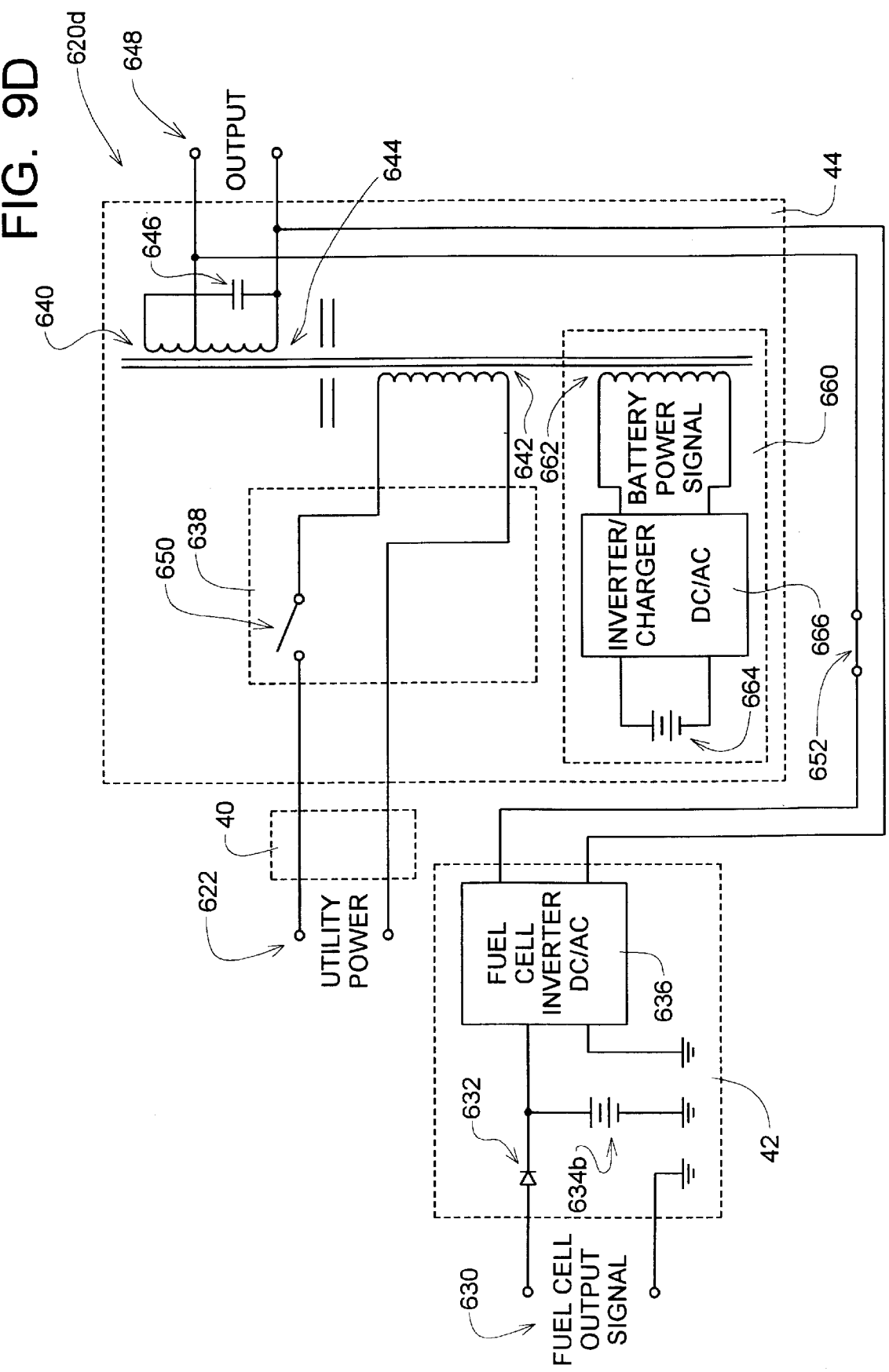

UNINTERRUPTIBLE POWER SUPPLIES USING FUEL CELLS

RELATED APPLICATIONS

This application claims priority of U.S. Provisional application Ser. No. 60/190,602 filed Mar. 20, 2000, and U.S. Provisional application Ser. No. 60/191,816 filed Mar. 24, 2000.

FIELD OF THE INVENTION

The present invention relates to uninterruptible power supply (UPS) systems and, more particularly, to power supplies that generate an AC power signal based on a selected one of a plurality of power sources.

BACKGROUND OF THE INVENTION

Electronic equipment is conventionally designed to operate on an alternating current power signal distributed by a public utility. The AC power signal is presumed to be present at all times and to be within certain predetermined parameters. If the AC power signal is not present, is disrupted, or does not fall within the predetermined parameters, the electronic equipment may fail to operate and/or operate unreliably. In such situations, the electronic equipment will be unable to perform its intended purpose.

UPS systems are often used in conjunction with certain electronic equipment to ensure the presence of an AC power signal that is within the required predetermined parameters. For example, telecommunications equipment, CATV equipment, and computers are often protected to some degree by UPS systems.

UPS's commonly create or pass an AC power signal from a first power source (the "line" signal) and generate the AC power signal from a second power source (the "standby" signal) when the first power source is disrupted. Commonly, the first power source is a utility power supply system, and the second power source is a battery or engine/generator that operates only when the utility power system is disrupted.

The need exists for efficient, reliable UPS systems that use the least expensive energy source available.

RELATED ART

The following patents were uncovered as part of a professional patentability search conducted on-behalf of the Applicant.

U.S. Pat. No. 6,011,324 issued to Kohistruck et al. discloses an uninterruptible power supply that operates based on either a line voltage or an electrical signal generated by a fuel cell and a current inverter.

U.S. Pat. No. 5,880,536 issued to Mardirossian discloses a fuel cell adapted for use by a consumer to supplement the electrical power provided by a utility power source.

U.S. Pat. No. 5,783,932 issued to Namba et al. discloses a power generation plant that employs a fuel cell to provide power when regenerative energy provided by a load commutated inverter can no longer be sustained.

U.S. Pat. No. 4,890,213 to Seki discloses a power converter that limits the voltage induced in d.c. windings of a transformer.

U.S. Pat. No. 4,775,800 to Wood discloses a power supply including a battery connected between a generator such as a fuel cell and a load. The battery stores energy when the energy supplied by the generator exceeds that required by the load.

U.S. Pat. No. 4,700,122 to Cimino et al. discloses a battery connected between a DC energy source and a load to filter the signal generated by the energy source.

U.S. Pat. No. 4,670,702 to Yamada et al. discloses a controller for a fuel cell power system. The controller employs switching elements to charge a battery in different modes depending upon the status of the fuel cell.

U.S. Pat. No. 4,472,641 discloses circuitry for combining power signals generated by a plurality of power modules of differing characteristics.

U.S. Pat. No. 4,251,736 discloses a force-commutated inverter that is arranged between an electrochemical cell and a power grid for adjusting the real and reactive power components of an AC power signal.

U.S. Pat. No. 3,823,358 to Rey discloses the use of a battery in parallel with a fuel cell to supply additional current when the demand of a load causes the voltage of the fuel cell to drop.

The following United States patents issued to the assignee of the present application relate to power supplies, some of which generate power signals based on separate power sources.

U.S. Pat. No. 6,014,015 to Thorne discloses a power supply that employs an internal combustion engine to generate an AC power signal.

U.S. Pat. No. 5,961,015 to Anderson et al. discloses a system for monitoring the status of components in a distributed system such as a communications system.

U.S. Pat. No. 5,892,431 to Osterman discloses a power multiplexer for use in broadband communications systems.

U.S. Pat. No. 5,760,495 to Mekanik discloses an inverter/charger circuit for use in uninterruptible power supplies.

U.S. Pat. Nos. 5,739,595 to Mekanik et al. and 5,410,720 to Osterman disclose power supplies that generate a waveform optimized for use in cable TV distribution systems.

U.S. Pat. Nos. 5,642,002 and 5,638,244 to Mekanik et al. disclose uninterruptible power supplies operating in line mode using utility power and in a standby mode using battery power.

SUMMARY OF THE INVENTION

The present invention may be embodied as an uninterruptible power supply system comprising a source of a utility power signal, a source of hydrogen, a fuel cell stack, first and second input circuits, an output circuit, and a control circuit. The fuel cell stack converts the hydrogen into a fuel cell output signal. The first input circuit is operatively connected to the utility power signal and outputs a first AC input signal based on the utility power signal. The second input circuit operatively is connected to the fuel cell output signal and generates a second AC input signal based on the fuel cell output signal. The output circuit is operatively connected to the first and second input circuits and outputs at least one output signal based on one of the first and second AC input signals. The control circuit operatively is connected to the fuel cell stack, the first input circuit, the second input circuit. The output circuit controls whether the output signal is generated based on the utility power signal or hydrogen.

Preferably, the present invention employs a switch-mode dc-to-dc voltage regulator to regulate the slow and rapid dynamics of the voltage obtained from the fuel cell stack. This switching voltage regulator operates with significant voltage ripple from the fuel cell stack.

The present invention may also be embodied as a system with a fuel cell used in continuous operation to provide power to an integrated electric power converter. This produces a very reliable system since the voltage and power delivered from the fuel cell to the electric power converter is not exposed to the potentially-destructive transients which are present on the utility electric lines.

The fuel cell and reformer control systems may need to respond differently in a system with a battery available as one of the power sources. The present invention may thus also be embodied as a system where the presence or absence of a battery is determined through any of several methods, including step response. The control algorithm for the fuel cell and fuel processor is based on the presence or absence of a battery. With no battery, the fuel cell is commanded on regardless of fuel cell output voltage. With battery present, the fuel cell is turned on at some minimum battery voltage and off at some maximum battery voltage.

The present invention has many applications but is of particular significance when implemented as a fuel cell system for powering a cable TV outside plant system.

The present invention may also be implemented using a fuel cell system which is a reformer-based system having a reserve of hydrogen to allow for instantaneous startup and rapid load dynamics. The use of such a reserve may eliminate the need for batteries.

DESCRIPTION OF THE DRAWING

FIG. 7 is a block diagram of a fourth exemplary AC power signal generation circuit that may be used by the UPS system depicted in FIGS. 1, 2, or 3;

FIGS. 8A–8D are block diagrams of a fifth, sixth, seventh, and eighth exemplary AC power signal generation circuits that may be used by the UPS system depicted in FIGS. 1, 2, or 3;

FIGS. 9A–9D are block diagrams of ninth, tenth, eleventh, and twelfth exemplary AC power signal generation circuits that may be used by the UPS system depicted in FIGS. 1, 2, or 3;

DETAILED DESCRIPTION OF THE INVENTION

In the following discussion, three separate embodiments of UPS systems constructed in accordance with the principles of the present invention will be described. Following that will be a discussion of eight exemplary embodiments of AC power signal generation circuits that may be used by any of the three embodiments of the UPS systems depicted in FIGS. 1, 2, or 3.

A. First Embodiment of a UPS System

Figure 1:
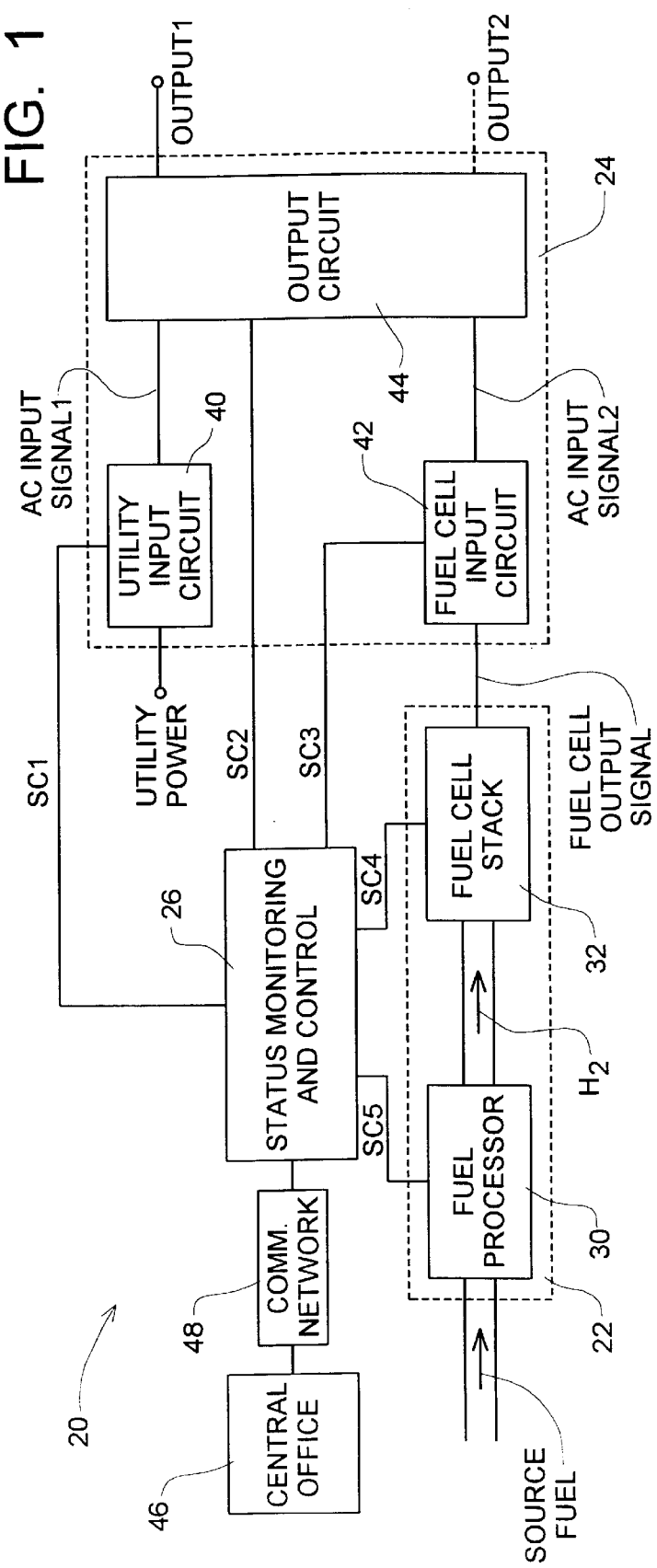
FIG. 1 is a block diagram of a first embodiment of a UPS system constructed in accordance with the principles of the present invention.

Referring initially to FIG. 1, depicted at 20 therein is a block diagram of a first embodiment of a UPS system constructed in accordance with, and embodying, the principles of the present invention. The UPS system 20 comprises a generator system 22, an AC power signal generation circuit 24, and a status monitoring and control circuit 26.

The UPS system 20 is optimized to use a generator system 22 that employs fuel cell technology to convert hydrogen into a DC power signal. The exemplary generator system 22 comprises a fuel processor 30 and a fuel cell stack 32. Except as noted below, the fuel cell processor 30 and fuel cell stack 32 are or may be conventional and will be described herein only to the extent necessary for a complete understanding of the present invention.

The fuel cell processor 30 converts a source fuel such as propane or natural gas into hydrogen. The fuel cell stack 32 employs an electromechanical process to convert the hydrogen into electricity. As is conventional, the fuel cell stack 32 also employs oxygen to convert the hydrogen into electricity. The fuel processor 30 is not an essential component of the present invention and may be omitted from the generator system 22 if a ready supply of hydrogen is on hand; in most geographical areas, however, other source fuels are more readily available, in which case the generator system 22 will include the fuel processor 30.

The output of the fuel cell stack 32 is a DC signal from which the output AC power signal generated by the UPS system 20 may be derived. However, the characteristics of the fuel cell output signal are such that this signal varies between upper and lower predetermined limits and may contain significant ripple. The fuel cell output signal should thus be regulated and converted to an AC signal, as will be described in detail below, before it may be used as the output AC power signal.

The exemplary AC power signal generation circuit 24 employed by the system 20 comprises a utility input circuit 40, a fuel cell input circuit 42, and an output circuit 44.

The output of the utility input circuit 40 is a first AC input signal that is derived from a utility power signal. In some situations, the utility power signal may simply be passed through a switch to generate the first input power signal; in other situations, the first input power signal is generated using active components based on the utility power signal.

The output of the fuel cell input circuit 42 is a second AC input signal that is derived from the fuel cell output signal. As will be described in further detail below, the fuel cell input circuit 42 comprises an inverter/charger circuit that converts the DC fuel cell output signal in the second AC input signal, while at the same time regulating second AC input signal to compensate for fluctuations and ripple in the fuel cell output signal.

The output circuit 44 passes one of the first and second AC power signals as an output AC power signal. As will be described in further detail below, in some embodiments the output circuit 44 may generate two or more output AC power signals as shown in FIG. 1.

The status monitoring and control circuit 26 is connected by data paths SC1, SC2, SC3, SC4, and SC5 to the utility input circuit 40, output control circuit 44, fuel cell input circuit 42, fuel cell stack 32, and fuel processor 30, respectively.

The data path SC1 carries one or more signals between the status monitoring and control circuit 26 and the utility input circuit 40. For example, the utility input circuit 40 may contain voltage and current sensors that generate voltage and current sense signals indicative of the status of the utility power signal. The status monitoring and control circuit 26 will analyze these voltage and current sense signals and generate a switch control signal that opens or closes a switch within the utility input circuit 40 that determines whether the first AC input signal reaches the output circuit 44.

The data path SC2 carries one or more signals between the status monitoring and control circuit 26 and the output circuit 44. For example, the output circuit 44 may contain voltage and current sensors that generate voltage and current sense signals indicative of the status of the output power signal(s). The status monitoring and control circuit 26 will analyze these voltage and current sense signals and generate a switch control signal that opens or closes one or more switches within the utility input circuit 40 and/or the fuel cell input circuit 42 that determine which of the first and second AC input signals reaches the output circuit 44.

The data path SC3 carries one or more signals between the status monitoring and control circuit 26 and the fuel cell input circuit 42. For example, the fuel cell input circuit 42 may contain voltage and current sensors that generate voltage and current sense signals indicative of the status of the fuel cell output signal. The status monitoring and control circuit 26 will analyze these voltage and current sense signals and generate a switch control signal that opens or closes a switch within the fuel cell input circuit 42 that determines whether the second AC input signal reaches the output circuit 44.

The data path SC4 carries one or more signals between the status monitoring and control circuit 26 and the fuel cell stack 32. These signals will control the operation of the fuel cell stack 32 and indicate operating parameters of the stack 32 such as operating temperature.

The data path SC5 carries one or more signals between the status monitoring and control circuit 26 and the fuel processor 30. These signals operate valves controlling the flow of the source fuel and hydrogen and contain data indicative of the operating parameters of the fuel processor 30 such as flow rates and the like.

Another purpose of the status monitoring and control circuit 26 is to coordinate operation of the generator system 22 with the AC power signal generating system 24. For example, the status monitoring and control circuit 26 may operate a switch within the utility input circuit 40 based on the status of the fuel processor 30; in this case, if the fuel processor 30 fails the output AC power signal will be generated based on the first AC input signal rather than the second AC input signal.

Optionally, the status monitoring and control circuit 26 may communicate the status of the UPS system 20 with a central office or head end 46 through a communications network 48 and allow the central office or head end 46 to control and monitor the operation of the system 20 through the network 48. The exemplary status monitoring and control circuit 26 will store a database of status and operation information related to the UPS system 20. This information is available to controllers at the central office 46 to facilitate operation and maintenance of the UPS system 20. It should be clear that the UPS system 20 may be implemented as a stand-alone system, however, and communication with a central office is not necessary to implement the teachings of the present invention.

The present invention may be configured to use the status monitoring and control system disclosed in U.S. Pat. No. 5,961,015 to Anderson et al.

In addition, the controllers may make and remotely implement operations decisions such as: (a) generating the AC output signal(s) based on the source fuel during times of peak use of utility power; and/or (b) generating the AC output signal(s) based on one or the other of the source fuel and utility power based on the costs of these energy sources.

In one example of the present invention, the communications network 48 may be a CATV system. A CATV communications network may use the CATV system for bidirectional transmission of status and control data from the central office or head end 46 to the status monitoring and control circuit 26. Another implementation of the communications network may further incorporate a telephony network that may be used to transmit status monitoring and control data between the central office 46 and the status monitoring and control circuit 26.

B. Second Embodiment of a UPS System

Figure 2:
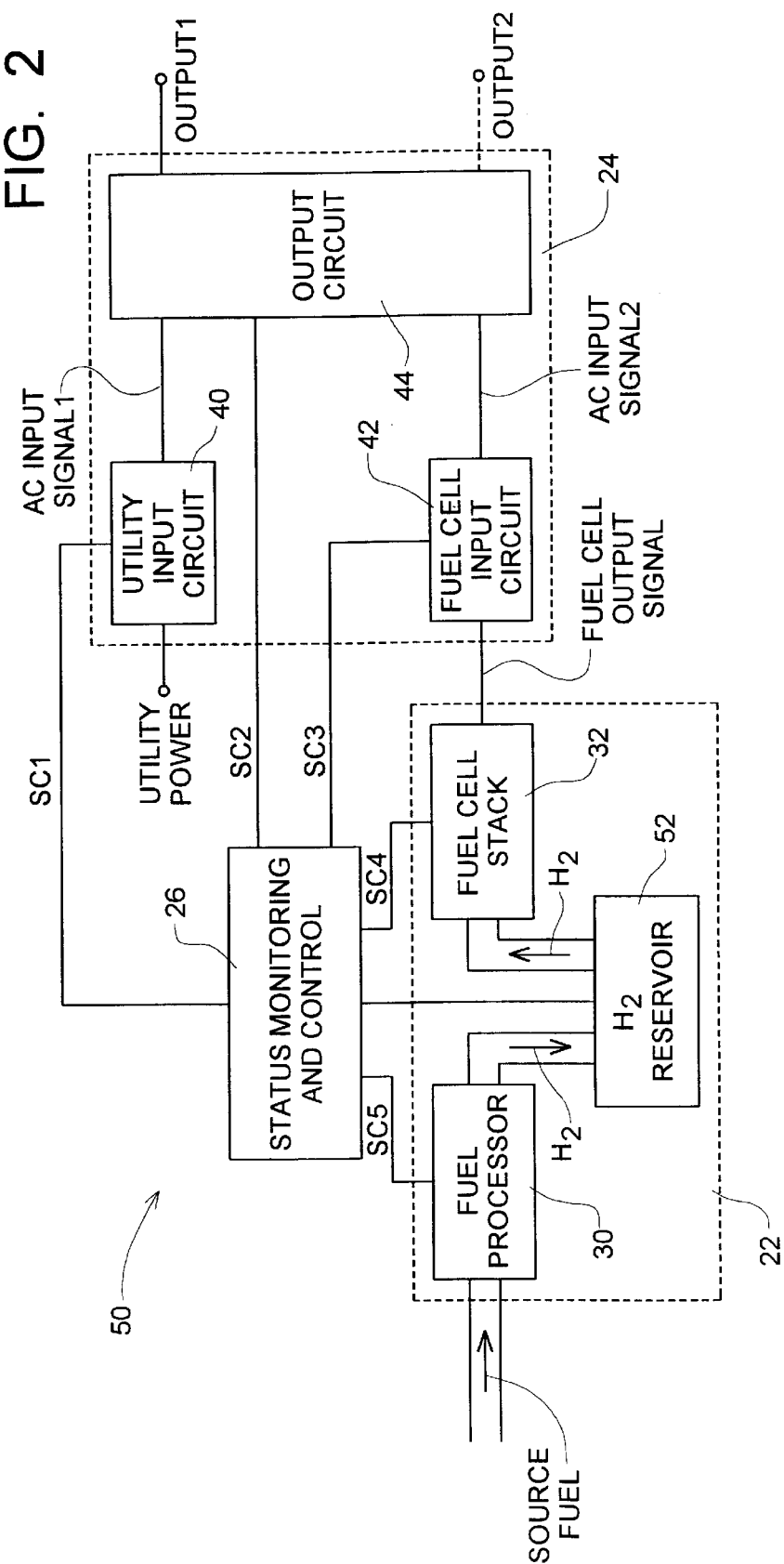
FIG. 2 is a block diagram of a second embodiment of a UPS system constructed in accordance with the principles of the present invention.

Referring now to FIG. 2, depicted at 50 therein is a second exemplary UPS system constructed in accordance with the principles of the present invention. The second UPS system 50 is in most respects similar to the first UPS system 20 described above and will be described herein only to the extent that it differs from the system 20. The same reference characters will be used in FIG. 2 to describe components that are the same as those in FIG. 1.

A comparison of FIGS. 1 and 2 indicates that a hydrogen reservoir 52 is arranged between the fuel processor 30 and the fuel cell stack 32. The hydrogen reservoir 52 will store a reserve of hydrogen for use by the fuel cell stack 32 when the generator system 22 is used in standby mode.

In particular, when the generator system 22 is used in line mode as the primary source of the AC output power signal, the fuel processor 30 continuously operates to generate hydrogen for use by the fuel cell stack 32, which also operates continuously. Alternatively, the generator system 22 may be used in the secondary or standby mode, in which case the fuel processor 30 and fuel cell stack 32 may be idle for substantial periods of time.

In either case, the UPS system 20 must "switch over" from one power source to the other without interruption of service to the load. The UPS system 20 thus must be capable of producing the AC output power signal during either of a predetermined switchover period. The time required for the UPS system to switch from one power source to another will be referred to as the response time.

The UPS system 20 will have a first response time in switching from the generator system 22 to utility power and a second response time in switching from utility power to the generator system 22. In practice, the first and second response times may be greater than the corresponding first or second predetermined switchover period.

The first response time is primarily affected by the time required for an electromechanical or solid state switch to connect the utility power to the AC power signal generating circuit 24. The system 20 may be provided with energy storage, in the form of a capacitor, a battery, or a ferroresonant transformer, as will be described in detail below, to maintain generation of the AC output power signal during the first response time.

The second response time is affected by the ability of the fuel processor 30 to begin producing hydrogen and/or the ability of the fuel cell stack 32 to begin converting the hydrogen into electricity.

To maintain generation of the AC output power signal during the second response time, the hydrogen reservoir 52 holds a small amount of hydrogen so that the fuel cell stack 32 may be turned on and begin generating the fuel cell output signal without waiting for the fuel cell processor to begin producing hydrogen. The reservoir 52 should be sized such that the fuel processor 30 begins operating before the hydrogen in the reservoir 52 is depleted. Once operating, the fuel processor 30 generates sufficient hydrogen to refill the reservoir 52 and to satisfy the operating requirements of the fuel cell stack 32.

In many situations, the reservoir 52 may allow the generator system 22 to begin generating the fuel cell output signal within the predetermined switchover period defined for the UPS system 20. The reservoir 52 may thus obviate the need for an electrical energy storage element such as a battery or capacitor for generating the fuel cell output signal until the fuel processor 30 can generate sufficient quantities of fuel.

The status monitoring and control circuit 26 may also be connected to the hydrogen reservoir 52 by a data path SC6 to allow control and status information to be passed between the circuit 26 and the reservoir 52.

C. Third Embodiment of a UPS System

Figure 3:
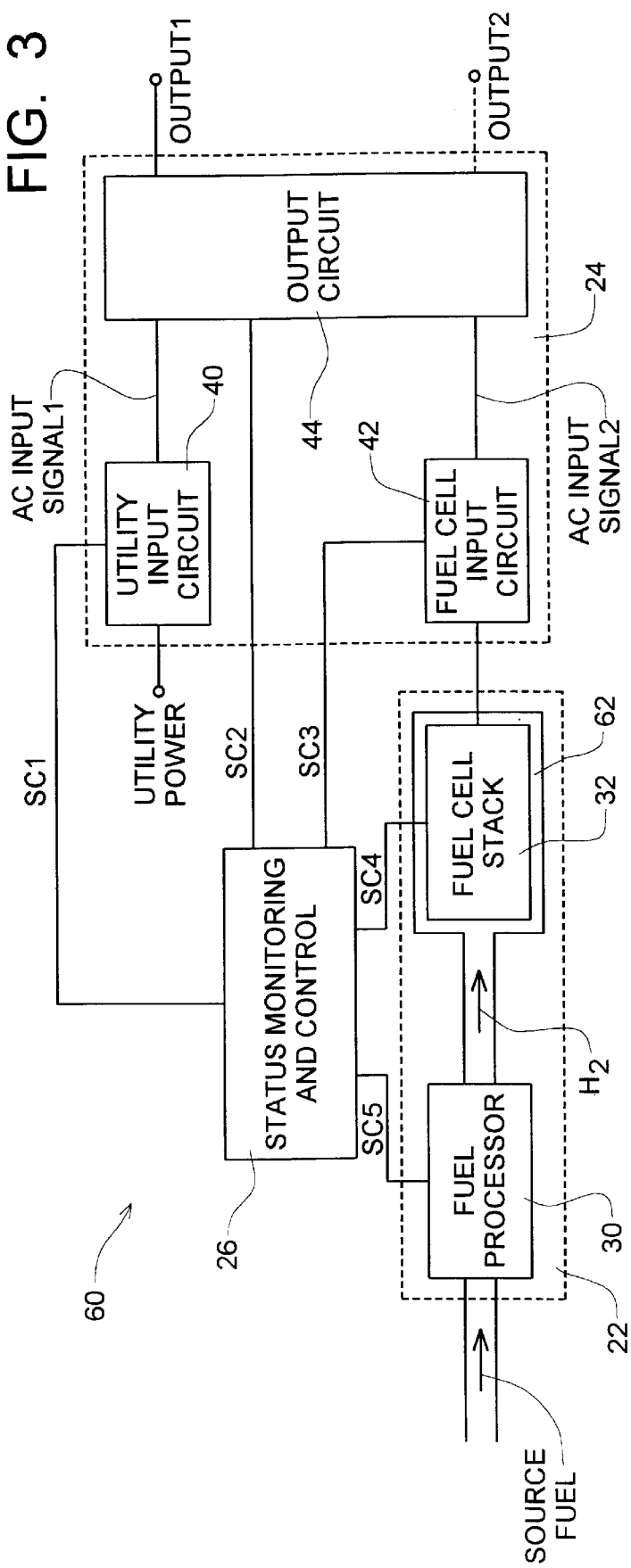
FIG. 3 is a block diagram of a third embodiment of a UPS system constructed in accordance with the principles of the present invention.

Referring now to FIG. 3, depicted at 60 therein is a third exemplary UPS system constructed in accordance with the principles of the present invention. The third UPS system 60 is in most respects similar to the first UPS system 50 described above and will be described herein only to the extent that it differs from the system 50. The same reference characters will be used in FIG. 3 to describe components that are the same as those in FIG. 2.

A comparison of FIGS. 2 and 3 indicates that the separate, discrete hydrogen reservoir 52 of the system 50 has been replaced by an internal or parasitic hydrogen reservoir 62 formed by the fuel cell stack 32. The fuel cell stack 32 of this system 60 is not conventional in that it includes the internal hydrogen reservoir 62.

The internal reservoir 62 is formed by over-sizing the conduits that connect the fuel processor 30 with the fuel cell stack 32, the housing of the fuel stack 32, and/or internal conduits of the fuel cell stack 32 by a predetermined increased volume beyond what is necessary simply to allow sufficient fluid flow between the processor 30 and stack 32. This predetermined increased volume stores hydrogen such that enough hydrogen is available to allow the fuel cell stack 32 to generate the fuel cell output signal until the fuel processor 30 can begin producing hydrogen in sufficient quantities to satisfy the operating requirements of the fuel cell stack 32.

In many situations, the internal reservoir 62 may allow the generator system 22 to begin generating the fuel cell output signal within the predetermined switchover period defined for the UPS system 20. The internal reservoir 62 may thus obviate the need for an electrical energy storage element such as a battery or capacitor for generating the fuel cell output signal until the fuel processor 30 can generate sufficient quantities of fuel.

D. First Embodiment of an AC Power Signal Generation Circuit

Figure 4:
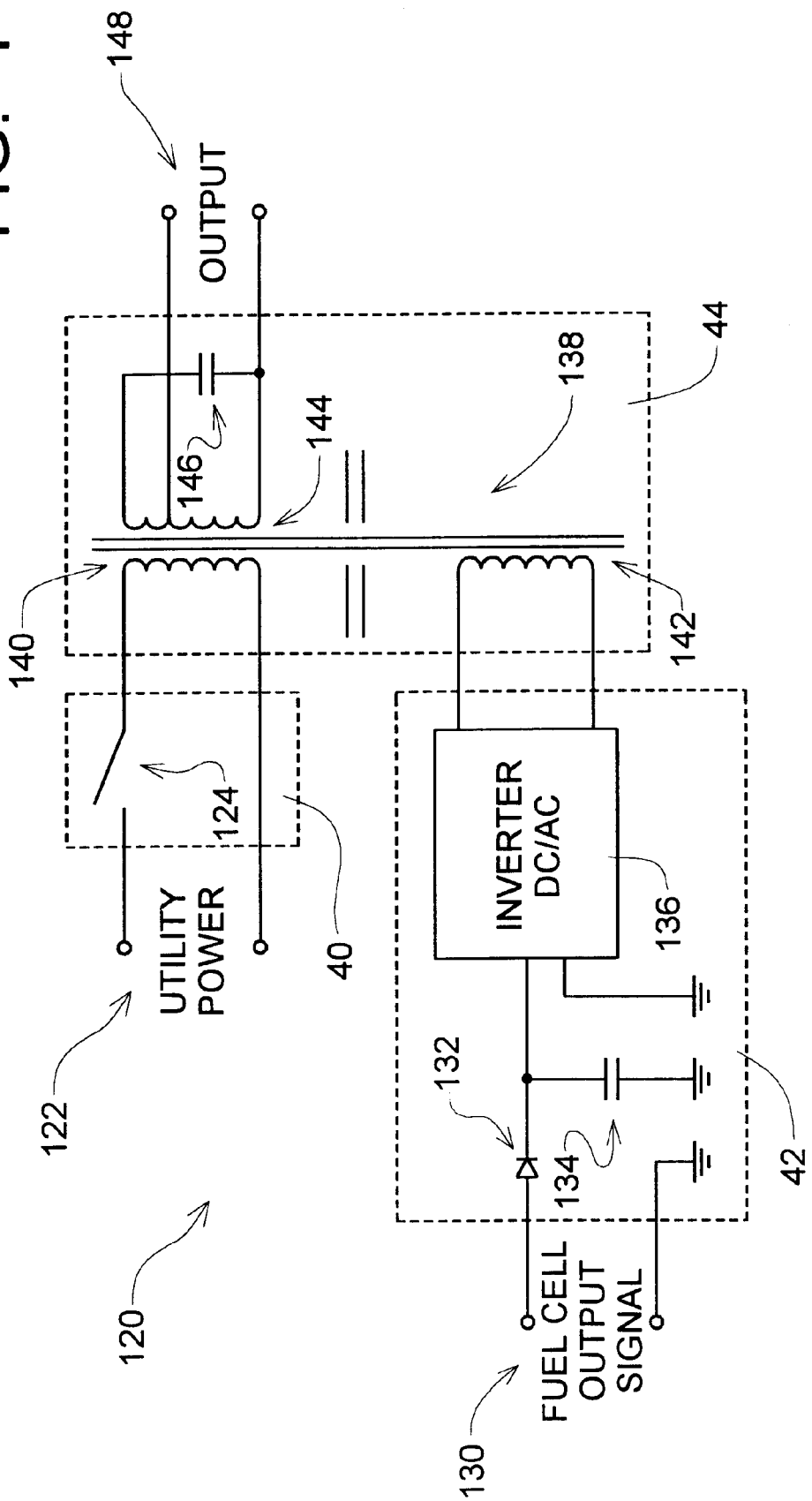
FIG. 4 is a block diagram of a first exemplary AC power signal generation circuit that may be used by the UPS system depicted in FIG. 1.

Referring now to FIG. 4, depicted at 120 therein is a first embodiment of an AC power signal generation circuit that may be used by any of the UPS systems 20, 50, and 60 described above.

The exemplary utility input circuit 40 of the generation circuit 120 comprises first input terminals 122 that are connected to the source of utility power and a switch 124 that allows the output circuit 44 to be disconnected from the terminals 122.

The exemplary fuel cell input circuit 42 comprises second input terminals 130, a diode 132, storage capacitor 134, and an inverter/charger circuit 136. The second input terminals 130 are connected to the fuel cell stack 32 such that the DC fuel cell output voltage is present across these terminals 130.

When the AC power generation circuit 120 generates the AC output power signal based on the utility power signal, the inverter charger circuit 136 charges the storage capacitor 134. Thus, should the utility power signal fail, the inverter/charger circuit 136 can generate the second AC input signal based on energy stored in the capacitor 134 until the fuel cell stack 32 begins generating electricity. The diode 132 prevents current that flows into and charges the storage capacitor 134 from flowing back into the fuel cell stack 32.

The exemplary output circuit 44 comprises a ferroresonant transformer 138 having first primary windings 140, second primary windings 142, and secondary windings 144. The output circuit 44 further comprises a ferroresonant capacitor 146 connected across the secondary windings 144; output terminals 148 are connected across a portion of the secondary windings 144.

The first primary windings 140 are connected through the switch 124 to the first input terminals 122. The second primary windings are connected to the inverter/charger circuit 136. So connected, the output AC power signal is present across the output terminals 148. The ferroresonant transformer 138 and ferroresonant capacitor 146 regulate the output AC power signal as is well-known in the art.

In addition, if the generator system 22 is the primary energy source and the fuel cell output signal is disrupted, sufficient energy is stored by the transformer 138 to maintain the AC output power signal until the switch 124 can be closed to allow the first AC input signal to reach the output circuit 44.

The status monitoring and control circuit 26 controls the switch 124 through the data path SC1 and the inverter/charger circuit 136 through the data path SC3.

E. Second Embodiment of an AC Power Signal Generation Circuit

Figure 5:
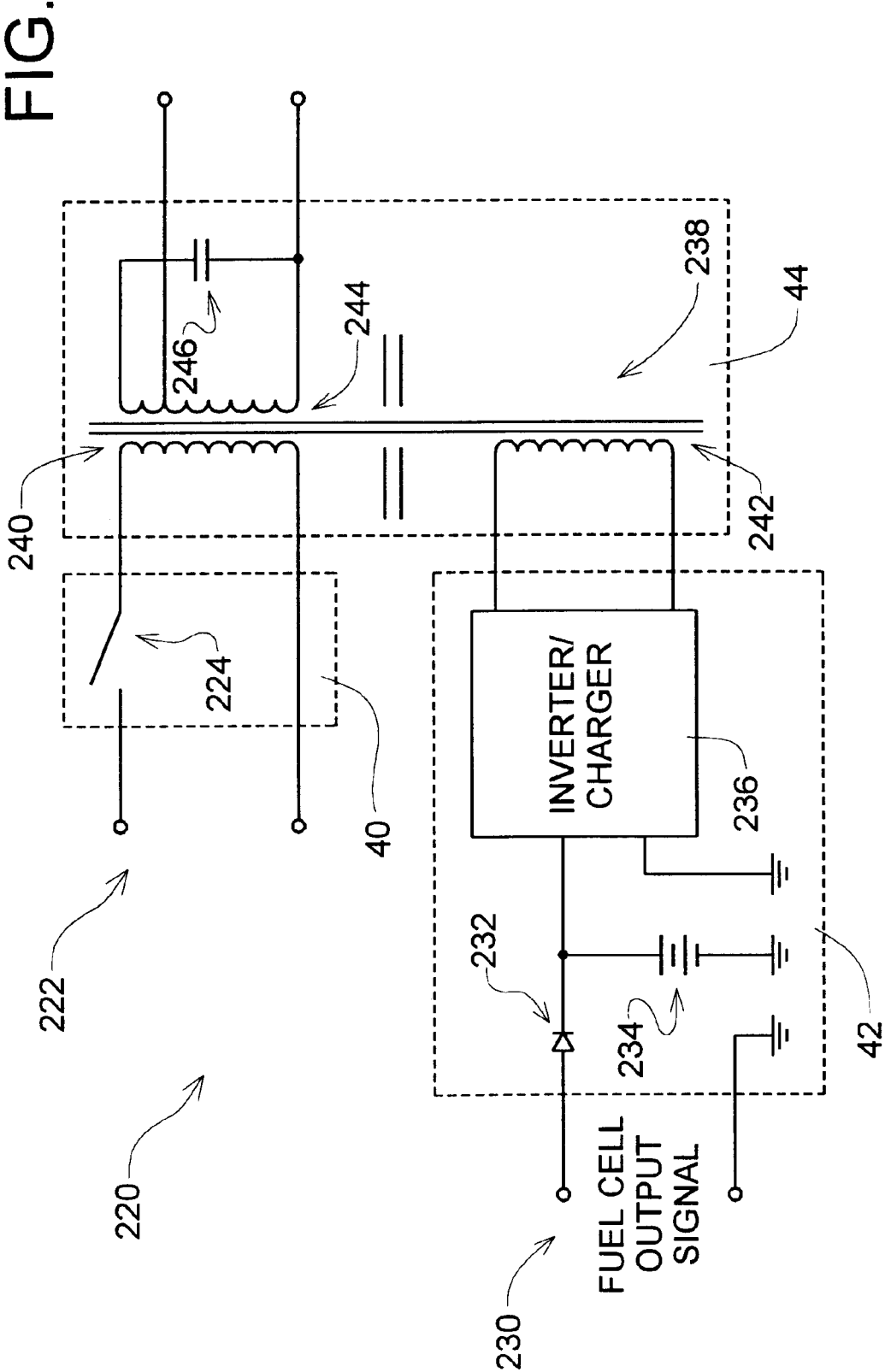
FIG. 5 is a block diagram of a second exemplary AC power signal generation circuit that may be used by the UPS system depicted in FIGS. 1, 2, or 3.

Referring now to FIG. 5, depicted at 220 therein is a second embodiment of an AC power signal generation circuit that may be used by any of the UPS systems 20, 50, and 60 described above.

The exemplary utility input circuit 40 of the generation circuit 220 comprises first input terminals 222 that are connected to the source of utility power and a switch 224 that allows the output circuit 44 to be disconnected from the terminals 222.

The exemplary fuel cell input circuit 42 comprises second input terminals 230, a diode 232, battery system 234, and an inverter/charger circuit 236. The second input terminals 230 are connected to the fuel cell stack 32 such that the DC fuel cell output voltage is present across these terminals 230.

When the AC power generation circuit 220 generates the AC output power signal based on the utility power signal, the inverter charger circuit 236 charges the battery 234. Thus, should the utility power signal fail, the inverter/charger circuit 236 can generate the second AC input signal based on energy stored in the battery 234 until the fuel cell stack 32 begins generating electricity. The diode 232 prevents current that charges the battery 234 from flowing back into the fuel cell stack 32.

The exemplary output circuit 44 comprises a ferroresonant transformer 238 having first primary windings 240, second primary windings 242, and secondary windings 244. The output circuit 44 further comprises a ferroresonant capacitor 246 connected across the secondary windings 244; output terminals 248 are connected across a portion of the secondary windings 244.

The first primary windings 240 are connected through the switch 224 to the first input terminals 222. The second primary windings are connected to the inverter/charger circuit 236. So connected, the output AC power signal is present across the output terminals 248. The ferroresonant transformer 238 and ferroresonant capacitor 246 regulate the output AC power signal as is well-known in the art.

As with the circuit 120 described above, if the generator system 22 is the primary energy source and the fuel cell output signal is disrupted, sufficient energy is stored by the transformer 238 to maintain the AC output power signal until the switch 224 can be closed to allow the first AC input signal to reach the output circuit 44.

The status monitoring and control circuit 26 controls the switch 224 through the data path SC1 and the inverter/charger circuit 236 through the data path SC3.

F. Third Embodiment of an AC Power Signal Generation Circuit

Figure 6:
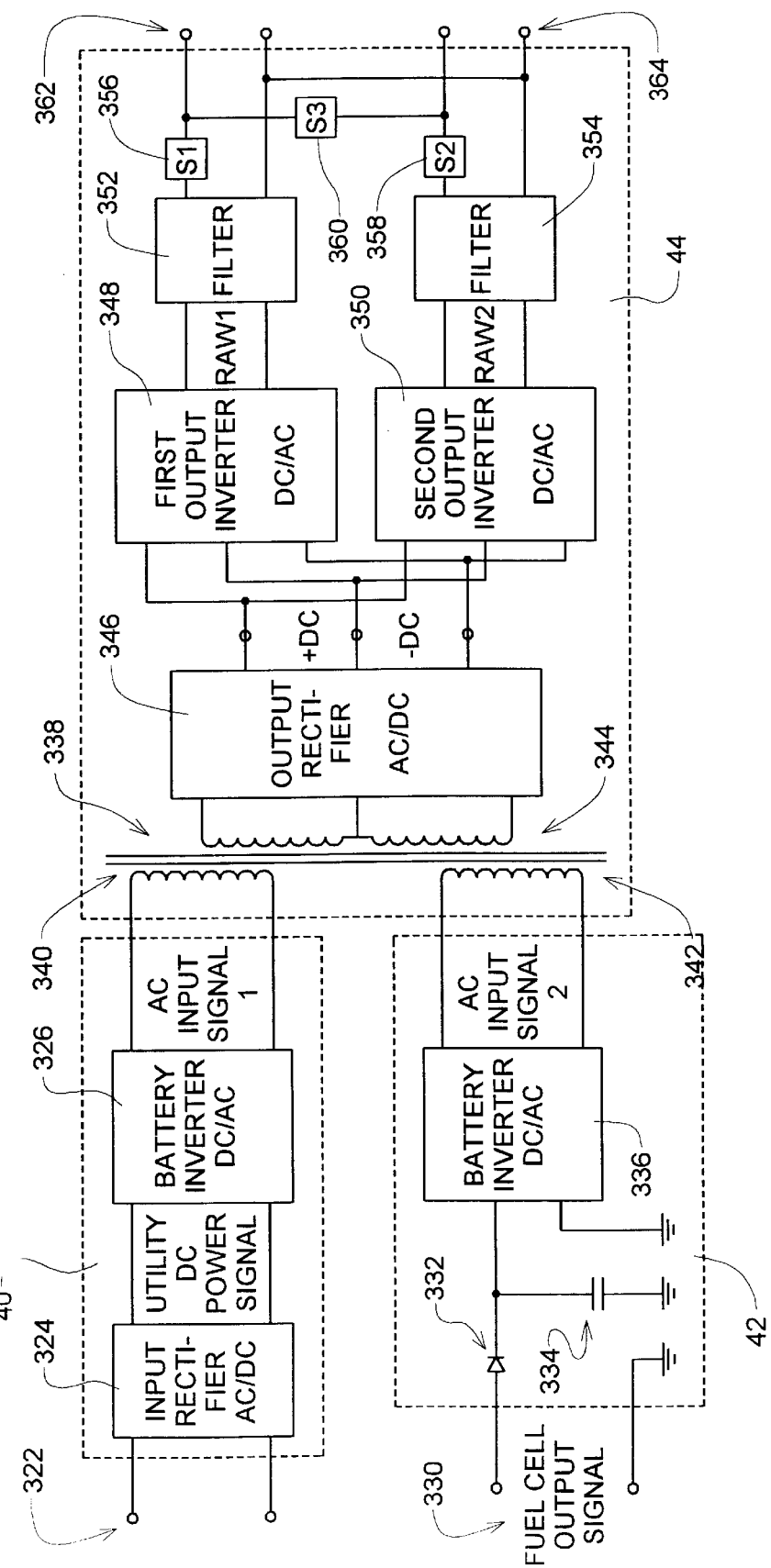
FIG. 6 is a block diagram of a third exemplary AC power signal generation circuit that may be used by the UPS system depicted in FIGS. 1, 2, or 3.

Referring now to FIG. 6, depicted at 320 therein is a third embodiment of an AC power signal generation circuit that may be used by any of the UPS systems 20, 50, and 60 described above.

The exemplary utility input circuit 40 of the generation circuit 320 comprises first input terminals 322 that are connected to the source of utility power, an input rectifier 324, and a utility inverter 326. The input rectifier 324 generates a utility DC power signal that is in turn converted into the first AC input signal by the utility inverter 326. This arrangement allows power factor correction of the utility AC power signal.

The exemplary fuel cell input circuit 42 comprises second input terminals 330, a diode 332, storage capacitor 334, and a fuel cell inverter/charger circuit 336. The second input terminals 330 are connected to the fuel cell stack 32 such that the DC fuel cell output voltage is present across these terminals 330.

When the AC power generation circuit 320 generates the AC output power signal based on the utility power signal, the inverter charger circuit 336 charges the storage capacitor 334. Thus, should the utility power signal fail, the inverter/charger circuit 336 can generate the second AC input signal based on energy stored in the capacitor 334 until the fuel cell stack 32 begins generating electricity. The diode 332 prevents current that flows into and charges the storage capacitor 334 from flowing back into the fuel cell stack 32.

The exemplary output circuit 44 comprises a transformer 338 having first primary windings 340, second primary windings 342, and secondary windings 344. The output circuit 44 further comprises an output rectifier circuit 346 and first and second output inverters 348 and 350. The output rectifier 346 generates positive and negative DC signals, and the first and second output inverters 348 and 350 convert the output of the rectifier 346 into first and second raw AC signals. The raw AC signals are filtered by filter circuits 352 and 356 to obtain first and second AC output signals.

First, second, and third switches 356, 358, and 360 are arranged to allow the first and second AC output signals to be present at first and second output terminals 362 and 364. The first AC output signal may be present at terminal 362 and/or terminal 364, while the second AC output signal may be present at terminal 364 and/or terminal 362.

In addition, if the generator system 22 is the primary energy source and the fuel cell output signal is disrupted, sufficient energy is stored by the transformer 338 to maintain the AC output power signal until the switch 324 can be closed to allow the first AC input signal to reach the output circuit 44.

As with the circuits 120 and 220 described above, if the generator system 22 is the primary energy source and the fuel cell output signal is disrupted, sufficient energy is stored by the transformer 338 to maintain the AC output power signal until the switch 324 can be closed to allow the first AC input signal to reach the output circuit 44.

The status monitoring and control circuit 26 controls the utility inverter 326 through the data path SC1, the fuel cell inverter/charger circuit 336 through the data path SC3, and the first and second output inverters 348 and 350 and switches 356–360 through the data path SC2.

G. Fourth Embodiment of an AC Power Signal Generation Circuit

Referring now to FIG. 7, depicted at 420 therein is a fourth embodiment of an AC power signal generation circuit that may be used by any of the UPS systems 20, 50, and 60 described above.

The exemplary utility input circuit 40 of the generation circuit 420 comprises first input terminals 422 that are connected to the source of utility power, an input rectifier 424; and a utility inverter 426. The input rectifier 424 generates a utility DC power signal that is in turn converted into the first AC input signal by the utility inverter 426. This arrangement allows power factor correction of the utility AC power signal.

The exemplary fuel cell input circuit 42 comprises second input terminals 430, a diode 432, battery system 434, and an inverter/charger circuit 436. The second input terminals 430 are connected to the fuel cell stack 32 such that the DC fuel cell output voltage is present across these terminals 430. Current from the fuel cell stack 32 passes through the diode 432 to the batteries 434 and the inverter/charger circuit 436.

When the AC power generation circuit 420 generates the AC output power signal based on the utility power signal, the inverter charger circuit 436 charges the battery 434. Thus, should the utility power signal fail, the inverter/charger circuit 436 can generate the second AC input signal based on energy stored in the battery 434 until the fuel cell stack 32 begins generating electricity. The diode 432 prevents current that charges the battery 434 from flowing back into the fuel cell stack 32.

The exemplary output circuit 44 comprises a transformer 438 having first primary windings 440, second primary windings 442, and secondary windings 444. The output circuit 44 further comprises first and second rectifying diodes 446 and 448, first and second output inverters 450 and 452 connected to first and second output terminals 454 and 456, and a coupling capacitor 458.

The first primary windings 440 are connected to the output of the utility inverter/charger circuit 426. The second primary windings are connected to the fuel cell inverter/charger circuit 436. The rectifying diodes 446 and 448 create DC voltages from which the first and second output inverters 450 and 452 generate first and second output AC power signals across the output terminals 454 and 456.

As with the circuits 120, 220, and 320 described above, if the generator system 22 is the primary energy source and the fuel cell output signal is disrupted, sufficient energy is stored by the transformer 438 to maintain the AC output power signal until the switch 424 can be closed to allow the first AC input signal to reach the output circuit 44.

The status monitoring and control circuit 26 controls the utility inverter 426 through the data path SC1, the fuel cell inverter/charger circuit 436 through the data path SC3, and the first and second output inverters 450 and 452 through the data path SC2.

H. Fifth Embodiment of an AC Power Signal Generation Circuit

Referring now to FIG. 8A, depicted at 520a therein is a fifth embodiment of an AC power signal generation circuit that may be used by any of the UPS systems 20, 50, and 60 described above.

The exemplary utility input circuit 40 of the generation circuit 520a comprises first input terminals 522. In this embodiment, the utility input circuit 40 simply passes the utility power signal as the first AC input signal.

The exemplary fuel cell input circuit 42 comprises second input terminals 530, a diode 532, storage capacitor 534a, and an inverter/charger circuit 536. The second input terminals 530 are connected to the fuel cell stack 32 such that the DC fuel cell output voltage is present across these terminals 530. Current from the fuel cell stack 32 passes through the diode 532 to the storage capacitor 534a and the inverter/charger circuit 536.

When the AC power generation circuit 520a generates the AC output power signal based on the utility power signal, the inverter charger circuit 536 charges the storage capacitor 534a. Thus, should the utility power signal fail, the inverter/charger circuit 536 can generate the second AC input signal based on energy stored in the capacitor 534a until the fuel cell stack 32 begins generating electricity. The diode 532 prevents current that charges the capacitor 534a from flowing back into the fuel cell stack 32.

The exemplary output-circuit 44 comprises a switch array 538, a ferroresonant transformer 540 having first and second primary windings 542 and 543, secondary-windings 544, and a ferroresonant capacitor 546 connected across the secondary windings 544; output terminals 548 are connected across a portion of the secondary windings 544.

The switch array 538 comprises first and second switches 550 and 552. The first primary windings 540 are connected through the first switch 550 to the first input terminals 522; the second primary windings 543 are connected through the second switch 552 to the inverter/charger circuit 536. Only one of the first and second switches 550 and 552 can be closed at any given time. The output AC power signal is present across the output terminals 548. The ferroresonant transformer 538 and ferroresonant capacitor 546 regulate the output AC power signal as is well-known in the art.

As with the circuits 120, 220, 320, and 420 described above, if the generator system 22 is the primary energy source and the fuel cell output signal is disrupted, sufficient energy is stored by the transformer 540 to maintain the AC output power signal until the switches 550 and 552 can be operated to allow the first AC input signal to reach the output circuit 44.

The status monitoring and control circuit 26 controls the first switch 550 through the data path SC1 and the second switch 550 and the inverter/charger circuit 536 through the data path SC3.

I. Sixth Embodiment of an AC Power Signal Generation Circuit

Referring now to FIG. 8B, depicted at 520b therein is a sixth embodiment of an AC power signal generation circuit that may be used by any of the UPS systems 20, 50, and 60 described above. The exemplary system 520b is similar to the system 520a of the fifth embodiment and will be described herein only to the extent that the system 520b differs from the system 520a.

Instead of the storage capacitor 534a, the system 520b employs a rechargeable battery 534b. Current from the fuel cell stack 32 passes through the diode 532 to the rechargeable battery 534b and the inverter/charger circuit 536. When the AC power generation circuit 520b generates the AC output power signal based on the utility power signal, the inverter charger circuit 536 charges the rechargeable battery 534b.

J. Seventh Embodiment of an AC Power Signal Generation Circuit

Referring now to FIG. 8C, depicted at 520c therein is seventh embodiment of an AC power signal generation circuit that may be used by any of the UPS systems 20, 50, and 60 described above. The exemplary system 520c is similar to the system 520a of the fifth embodiment and will be described herein only to the extent that the system 520c differs from the system 520a.

In the system 520c, the output of the fuel cell inverter 536 is directly connected to the output terminals 548, bypassing the ferroresonant transformer 540. The second primary windings 543 are thus omitted in the system 520c.

K. Eighth Embodiment of an AC Power Signal Generation Circuit

Figure 8D:
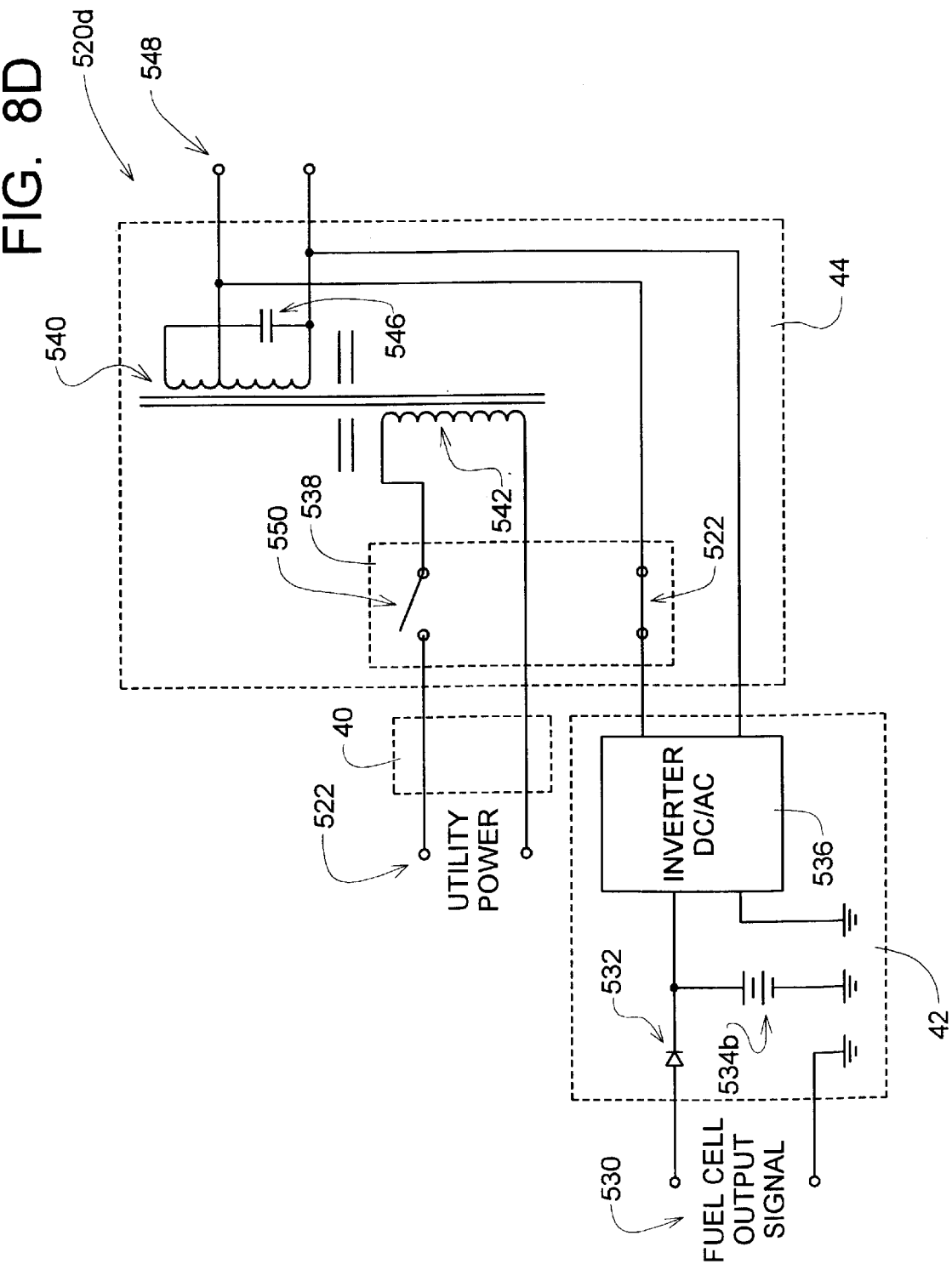

Referring now to FIG. 8D, depicted at 520d therein is an eighth embodiment of an AC power signal generation circuit that may be used by any of the UPS systems 20, 50, and 60 described above. In the exemplary system 520d, the fuel cell inverter 536 is directly connected to the output terminals 548 as in the circuit 520c and a rechargeable battery 534b is used instead of the storage capacitor 534a as in the circuit 520b.

L. Ninth Embodiment of an AC Power Signal Generation Circuit

Referring now to FIG. 9A, depicted at 620a therein is a ninth embodiment of an AC power signal generation circuit that may be used by any of the UPS systems 20, 50, and 60 described above.

The exemplary utility input circuit 40 of the generation circuit 620a comprises first input terminals 622. In this embodiment, the utility input circuit 40 simply passes the utility power signal as the first AC input signal.

The exemplary fuel cell input circuit 42 comprises second input terminals 630, a diode 632, an optional storage capacitor 634a, and an inverter/charger circuit 636. The second input terminals 630 are connected to the fuel cell stack 32 such that the DC fuel cell output voltage is present across these terminals 630. Current from the fuel cell stack 32 passes through the diode 632 to the storage capacitor 634a and the inverter/charger circuit 636.

When the AC power generation circuit 620a generates the AC output power signal based on the utility power signal, the inverter charger circuit 536 charges the storage capacitor 634a. Thus, should the utility power signal fail, the inverter/charger circuit 636 can generate the second AC input signal based on energy stored in the capacitor 634a until the fuel cell stack 32 begins generating electricity. The diode 632 prevents current that charges the capacitor 634a from flowing back into the fuel cell stack 32.

The exemplary output circuit 44 comprises a switch array 638, a ferroresonant transformer 640 having first and second primary windings 642 and 643 and secondary windings 644, and a ferroresonant capacitor 646 connected across the secondary windings 644; output terminals 648 are connected across a portion of the secondary windings 644.

The switch array 538 comprises first and second switches 650 and 652. The first primary windings 642 are connected through the first switch 650 to the first input terminals 622, while the second primary windings 643 are connected through the second switch 652 to the inverter/charger circuit 636. Only one of the first and second switches 650 and 652 can be closed at any given time.

The output AC power signal is present across the output terminals 648. The ferroresonant transformer 638 and ferroresonant capacitor 646 regulate the output AC power signal as is well-known in the art.

The output circuit 44 further comprises a battery system 660 comprising third primary windings 662 of the transformer 640, a battery 664, and an inverter/charger circuit 666. The inverter/charger circuit 666 generates an AC battery power signal across the second primary windings 662 of the transformer 640. The battery system 660 allows the designer to eliminate the storage capacitor 634a as the battery system 660 will maintain the AC output power signal when either the utility power signal or the fuel cell output signal is disrupted.

The battery system 660 thus allows the circuit 620a to generate the output AC power signal across the output terminals 648 from any one of four sources: the utility power signal, the fuel cell output signal, the energy stored by the capacitor 634a, or the energy stored by the battery 664. Again, in a given operational environment, the capacitor 634a may be eliminated.

The status monitoring and control circuit 26 controls the fuel cell inverter 636 through the data path SC3 and the first and second switches 650 and the inverter/charger circuit 666 through the data path SC2.

M. Tenth Embodiment of an AC Power Signal Generation Circuit

Referring now to FIG. 9B, depicted at 620b therein is a tenth embodiment of an AC power signal generation circuit that may be used by any of the UPS systems 20, 50, and 60 described above. The exemplary system 620b is similar to the system 620a of the seventh embodiment and will be described herein only to the extent that the system 620b differs from the system 620a.

Instead of the storage capacitor 634a, the system 620b employs a rechargeable battery 634b. Current from the fuel cell stack 32 passes through the diode 632 to the rechargeable battery 634b and the inverter/charger circuit 636. When the AC power generation circuit 620b generates the AC output power signal based on the utility power signal, the inverter charger circuit 636 charges the rechargeable battery 634b.

N. Eleventh Embodiment of an AC Power Signal Generation Circuit

Referring now to FIG. 9C, depicted at 620c therein is an eleventh embodiment of an AC power signal generation circuit that may be used by any of the UPS systems 20, 50, and 60 described above. The exemplary system 620c is similar to the system 620a of the ninth embodiment and will be described herein only to the extent that the system 620c differs from the system 620a.

In the system 620c, the output of the fuel cell inverter 636 is directly connected to the output terminals 648, bypassing the ferroresonant transformer 640. The second primary windings 643 are thus omitted in the system 620c.

O. Twelfth Embodiment of an AC Power Signal Generation Circuit

Referring now to FIG. 9D, depicted at 620d therein is a twelfth embodiment of an AC power signal generation circuit that may be used by any of the UPS systems 20, 50, and 60 described above. In the exemplary system 620d, the fuel cell inverter 636 is directly connected to the output terminals 648 as in the circuit 620c and a rechargeable battery 634b is used instead of the storage capacitor 634a as in the circuit 620b.

P. Thirteenth Embodiment of an AC Power Signal Generation Circuit

Figure 10:
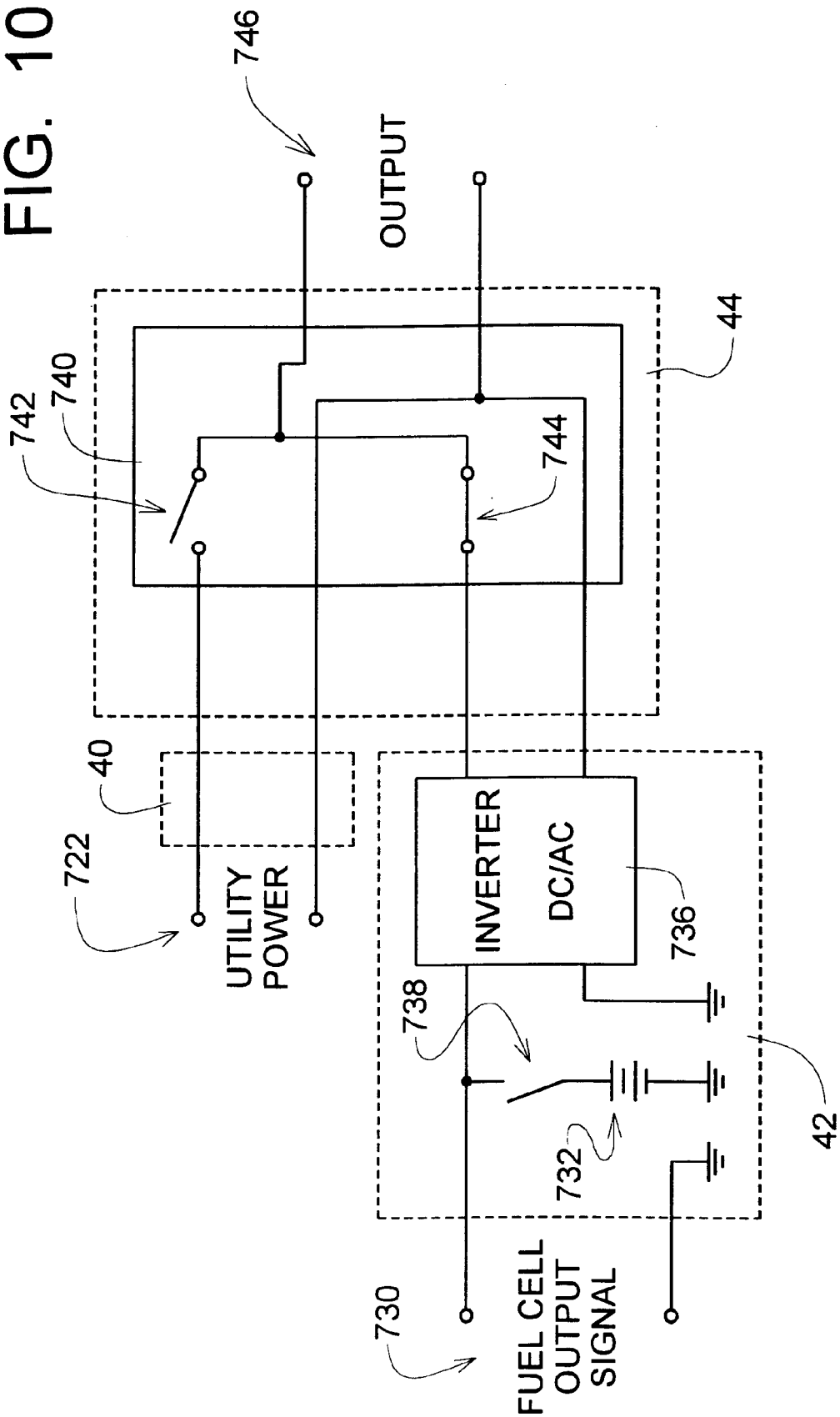
FIG. 10 is a block diagram of a thirteenth exemplary AC power signal generation circuit that may be used by the UPS system depicted in FIGS. 1, 2, or 3.

Referring now to FIG. 10, depicted at 720 therein is a thirteenth embodiment of an AC power signal generation circuit that may be used by any of the UPS systems 20, 50, and 60 described above.

The exemplary utility input circuit 40 of the generation circuit 720 comprises first input terminals 722. In this embodiment, the utility input circuit 40 simply passes the utility power signal as the first AC input signal.

The exemplary fuel cell input circuit 42 comprises second input terminals 730, a battery 732, a switch 734, and an inverter/charger circuit 736. The second input terminals 730 are connected to the fuel cell stack 32 such that the DC fuel cell output voltage is present across these terminals 730.

When the AC power generation circuit 720 generates the AC output power signal based on the utility power signal, the inverter charger circuit 736 charges the battery 732. Thus, should the utility power signal fail, the inverter/charger circuit 736 can generate the second AC input signal based on energy stored in the battery 732 until the fuel cell stack 32 begins generating electricity.

The switch 738 allows the battery 732 to be disconnected from the second input terminals 730 (and thus the fuel cell stack 32) when the fuel cell output signal does not fall within a predetermined range. More specifically, as described above the fuel cell output signal is a DC signal that varies anywhere within a first predetermined range of voltages. The battery 732 is designed to operate within a second predetermined range that may be narrower than the first predetermined range. The switch 738 is operated, for example under control of the status monitoring and control circuit 26, such that the switch 738 is opened when the fuel cell output signal is outside of the second predetermined range.

Alternatively, instead of disconnecting the battery 732 using the switch 738, a similar result may be obtained by appropriate control of the generator system 22. Using this alternative method, the generator system 22 itself may be turned on and off based on the voltage across the battery 732. If the voltage across the battery 732 is outside of a certain predetermined range, the generator system 22 is turned off; but if the voltage across the battery 732 is within the predetermined range, the generator system 22 is turned on.

In either situation, the logic is preferably implemented by the status monitoring and control circuit 26, which monitors and/or controls the generator system 22, the output circuit 44, and the fuel cell output circuit 42 through the data paths SC2, SC3, SC4, and SC5.

The exemplary output circuit 44 comprises a switch array 740 comprising first and second switches 742 and 744 and output terminals 746. The first input terminals are connected through the first switch 742 to the output terminals 746. The inverter/charger circuit 736 is connected through the second switch 744 to the output terminals 746. Only one of the first and second switches 742 and 744 can be closed at any given time. The output AC power signal is formed by one of the first and second AC input signals and is present across the output terminals 748.

The status monitoring and control circuit 26 controls the inverter 736 and switch 738 through the data path SC3 and the first and second switches 650 and 652 through the data path SC2.

Given the foregoing, it should be clear that the present invention may be embodied in forms other than those described above. The scope of the present invention should thus be determined by the following claims and not the foregoing detailed descriptions.

What is claimed is:

1. An uninterruptible power supply system comprising:
   a source of a utility power signal;
   a source of hydrogen;
   a fuel cell stack for converting the hydrogen into a fuel cell output signal;
   a first input circuit operatively connected to the utility power signal, where the first input circuit outputs a first AC input signal based on the utility power signal;
   a second input circuit operatively connected to the fuel cell output signal, where-the second input circuit generates a second AC input signal based on the fuel cell output signal;
   an output circuit operatively connected to the first and second input circuits, where the output circuit outputs at least one output signal based on one of the first and second AC input signals; and
   a control circuit operatively connected to the fuel cell stack, the first input circuit, the second input circuit, and the output circuit for controlling whether the output signal is generated based on the utility power signal or hydrogen.

2. An uninterruptible power supply system as recited in claim 1, in which the hydrogen is produced in a fuel processor that generates hydrogen from a source fuel.

3. An uninterruptible power supply system as recited in claim 1, further comprising a reservoir for storing hydrogen for use by the fuel cell stack.

4. An uninterruptible power supply as recited in claim 3, in which the reservoir is integrally formed with the fuel cell stack.

5. An uninterruptible power supply system as recited in claim 2, further comprising a reservoir for storing hydrogen, wherein the reservoir is operatively connected between the fuel processor and the fuel cell stack.

6. An uninterruptible power supply system as recited in claim 1, in which the first input circuit comprises a first switch, where the control circuit opens and closes the first switch to control whether the output signal is generated based on the utility power signal.

7. An uninterruptible power supply system as recited in claim 1, in which the second input circuit comprises an inverter for generating the second AC power signal based on the fuel cell output signal.

8. An uninterruptible power supply system as recited in claim 1, in which the second input circuit comprises an energy storage device operatively connected between the fuel cell stack and the output circuit.

9. An uninterruptible power supply system as recited in claim 7, in which the second input circuit comprises an energy storage device operatively connected between the fuel cell stack and the inverter.

10. An uninterruptible power supply system as recited in claim 8, further comprising a circuit element for substantially preventing current flow from the energy storage device to the fuel cell stack.

11. An uninterruptible power supply system as recited in claim 9, further comprising a circuit element for substantially preventing current flow from the energy storage device to the fuel cell stack.

12. An uninterruptible power supply system as recited in claim 1, in which the output circuit comprises a ferroresonant transformer.

13. An uninterruptible power supply system as recited in claim 1, in which:
   the first input circuit comprises a first switch, where the control circuit opens and closes the first switch to control whether the output signal is generated based on the utility power signal;
   the second input circuit comprises
      an inverter for generating the second AC power signal based on the fuel cell output signal,
      an energy storage device operatively connected between the fuel cell stack and the inverter, and
      a circuit element for substantially preventing current flow from the energy storage device to the fuel cell stack; and
   the output circuit comprises a ferroresonant transformer.

14. An uninterruptible power supply system as recited in claim 1, in which the first input circuit comprises:
   a utility rectifier for generating a utility DC power signal based on the utility power signal; and
   a utility inverter for generating the first AC input signal based on the utility DC power signal.

15. An uninterruptible power supply as recited in claim 1, in which the output circuit comprises:
   a transformer having
      first and second windings operatively connected to the first and second AC input circuits, respectively, and
      output windings; and
   an output rectifier operatively connected to the output windings, where the output rectifier generates an output DC signal based on the first and second AC input signals; and
   an output inverter operatively connected to the output rectifier, where the output inverter generates the output signal based on the output DC signal.

16. An uninterruptible power supply as recited in claim 15, in which the output circuit further comprises first and second output inverters operatively connected to the output rectifier, where the output inverters generate first and second output signals based on the output DC signal.

17. An uninterruptible power supply as recited in claim 16, in which the output circuit further comprises:
   first and second output terminals, where the first and second output signals are present at the first and second output terminals, respectively; and
   a switch array operatively connected between the first and second output inverters and the first and second output terminals, where the switch array is operated to allow either of the first and second output signals to be generated by either of the first and second output inverters.

18. An uninterruptible power supply as recited in claim 1, in which:
   the first input circuit comprises
      a utility rectifier for generating a utility DC power signal based on the utility power signal,
      a utility inverter for generating the first AC input signal based on the utility DC power signal;
   the second input circuit comprises
      an inverter for generating the second AC power signal based on the fuel cell output signal,
      the second input circuit comprises an energy storage device operatively connected between the fuel cell stack and the inverter; and
   the output circuit comprises
      a transformer having
         first and second windings operatively connected to the first and second AC input circuits, respectively, and
         output windings; and an output rectifier operatively connected to the output windings, where the output rectifier generates an output DC signal based on the first and second AC input signals; and an output inverter operatively connected to the output rectifier, where the output inverter generates the output signal based on the output DC signal.

19. An uninterruptible power supply as recited in claim 18, in which the output circuit further comprises first and second output inverters operatively connected to the output rectifier, where the output inverters generate first and second output signals based on the output DC signal.

20. An uninterruptible power supply as recited in claim 19, in which the output circuit further comprises:

first and second output terminals, where the first and second output signals are present at the first and second output terminals, respectively; and a switch array operatively connected between the first and second output inverters and the first and second output terminals, where the switch array is operated to allow either of the first and second output signals to be generated by either of the first and second output inverters.

21. An uninterruptible power supply as recited in claim 1, in which the first input circuit passes the utility power signal as the first AC input signal.

22. An uninterruptible power supply as recited in claim 1, in which the output circuit comprises:

output terminals across which the output signal is present;

a ferroresonant transformer having first and second input windings connected to the first and second input circuits, respectively, and output windings connected to the output terminals; and a switch array operatively connected between the first and second input circuits and the first and second input windings of the ferroresonant transformer for allowing the output circuit to generate the output signal on a selected one of the first and second AC input signals.

23. An uninterruptible power supply as recited in claim 1, in which:

the first input circuit passes the utility power signal as the first AC input signal;

the second input circuit comprises an inverter for generating the second AC power signal based on the fuel cell output signal, an energy storage device operatively connected between the fuel cell stack and the inverter, and a circuit element for substantially preventing current flow from the energy storage device to the fuel cell stack; and the output circuit comprises output terminals across which the output signal is present, a ferroresonant transformer having first and second input windings connected to the first and second input circuits, respectively, and output windings connected to the output terminals, and a switch array operatively connected between the first and second input circuits and the first and second input windings of the ferroresonant transformer for allowing the output circuit to generate the output signal on a selected one of the first and second AC input signals.

24. An uninterruptible power supply as recited in claim 1, in which the output circuit comprises:

output terminals across which the output signal is present; and a switch array operatively connected between the first and second input circuits and the output terminals for allowing the output signal to be generated based on a selected one of the first and second AC input signals.

25. An uninterruptible power supply as recited in claim 1, in which:

the first input circuit passes the utility power signal as the first AC input signal;

the second input circuit comprises an inverter for generating the second AC power signal based on the fuel cell output signal, and an energy storage device operatively connected between the fuel cell stack and the inverter; and the output circuit comprises output terminals across which the output signal is present, and a switch array operatively connected between the first and second input circuits and the output terminals for allowing the output signal to be generated based on a selected one of the first and second AC input signals.

26. An uninterruptible power supply as recited in claim 25, in which the output circuit further comprises a circuit element for preventing flow of current between the energy storage device to the fuel cell stack.

27. An uninterruptible power supply as recited in claim 26, in which the circuit element for preventing flow of current from the energy storage device to the fuel cell stack is a switch.

28. An uninterruptible power supply as recited in claim 27, in which the switch is opened when the fuel cell output signal is outside of a predetermined range and closed when the fuel cell output signal is within the predetermined range.

29. An uninterruptible power supply as recited in claim 1, in which the uninterruptible power supply is operatively connected to a communications network.

30. An uninterruptible power supply as recited in claim 29, in which the communications allows the transmission of status and control data between the control circuit and a remote location.

* * * * *